United States Patent
Nebel

(10) Patent No.: US 10,167,178 B2
(45) Date of Patent: Jan. 1, 2019

(54) LEVELING JACK WITH DIRECT ACTUATION

(71) Applicant: LIPPERT COMPONENTS, INC., Elkhart, IN (US)

(72) Inventor: Michael Warren Nebel, Smith Center, KS (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 148 days.

(21) Appl. No.: 15/222,545

(22) Filed: Jul. 28, 2016

(65) Prior Publication Data

US 2017/0015285 A1 Jan. 19, 2017

Related U.S. Application Data

(63) Continuation-in-part of application No. 15/081,106, filed on Mar. 25, 2016.

(60) Provisional application No. 62/207,584, filed on Aug. 20, 2015, provisional application No. 62/139,413, filed on Mar. 27, 2015.

(51) Int. Cl.
*B66F 3/00* (2006.01)
*B66F 3/20* (2006.01)
*B60S 9/06* (2006.01)
*B66F 3/08* (2006.01)
*B66F 3/24* (2006.01)

(52) U.S. Cl.
CPC ........ *B66F 3/20* (2013.01); *B60S 9/06* (2013.01); *B66F 3/08* (2013.01); *B66F 3/24* (2013.01); *B66F 3/247* (2013.01); *B66F 2700/04* (2013.01); *B66F 2700/05* (2013.01)

(58) Field of Classification Search
CPC .......... B66F 2700/04; B66F 3/08; B66F 3/12; B66F 3/22; B66F 3/44; B66F 7/06; B66F 7/0608; B66F 7/0691; B66F 7/14; B60S 9/06

See application file for complete search history.

(56) References Cited

U.S. PATENT DOCUMENTS

| | | | |
|---|---|---|---|
| 1,088,263 A | 2/1914 | Davy | |
| 1,273,833 A | 7/1918 | Dewey | |
| 1,393,851 A | 10/1921 | Thorndike | |
| 1,725,216 A | 8/1929 | Seldomridge | |
| 1,794,165 A * | 2/1931 | Gannaway | B66F 7/0608 108/147 |
| 1,794,532 A | 3/1931 | Gennaro | |
| 2,054,455 A | 9/1936 | Barbetta | |
| 2,449,850 A | 9/1948 | Huhle | |

(Continued)

FOREIGN PATENT DOCUMENTS

| | | | | |
|---|---|---|---|---|
| GB | 2265882 A | * | 10/1993 | ................ B60S 9/06 |
| WO | WO 9609197 A1 | * | 3/1996 | ................ B60S 9/06 |

*Primary Examiner* — Tyrone V Hall, Jr.
(74) *Attorney, Agent, or Firm* — Barnes & Thornburg LLP

(57) ABSTRACT

A leveling and stabilizing jack includes an intermediate member joining first and second lifting sections. Each lifting section includes a cross beam, a leg, a brace, a foot, a motor and a drive screw. The motor powers the drive screw, which is operably associated with the leg, to cause the leg to extend away from or retract toward the cross beam depending on the motor's direction of rotation. A motor control can control the motor of each of the lifting sections independently in a manner that results in leveling of the jack when deployed.

21 Claims, 19 Drawing Sheets

(56) References Cited

U.S. PATENT DOCUMENTS

| | | | |
|---|---|---|---|
| 3,645,501 A | | 2/1972 | Musgrove |
| 3,938,780 A | | 2/1976 | Hauptman |
| 4,103,869 A | * | 8/1978 | Mesny ............... B60S 9/06 |
| | | | 254/425 |
| 4,723,306 A | | 2/1988 | Fuenfgelder |
| 4,955,450 A | * | 9/1990 | Deinlein-Kalb ........ B60S 9/205 |
| | | | 180/199 |
| 5,205,586 A | * | 4/1993 | Tallman ............... B60S 9/06 |
| | | | 254/424 |
| 5,538,265 A | | 7/1996 | Chen |
| 5,826,889 A | * | 10/1998 | Eden ............... B60S 9/06 |
| | | | 180/41 |
| 6,139,056 A | | 10/2000 | Sourdeau |
| 6,224,102 B1 | * | 5/2001 | Nebel ............... B60S 9/06 |
| | | | 254/424 |
| 6,907,835 B1 | * | 6/2005 | Derner ............... B63C 3/00 |
| | | | 114/44 |
| 2002/0062686 A1 | * | 5/2002 | Keaton ............ B60P 1/4421 |
| | | | 73/116.01 |
| 2014/0117297 A1 | | 5/2014 | Garceau |
| 2015/0340926 A1 | * | 11/2015 | Searfoss ............ H02K 7/116 |
| | | | 310/83 |

* cited by examiner

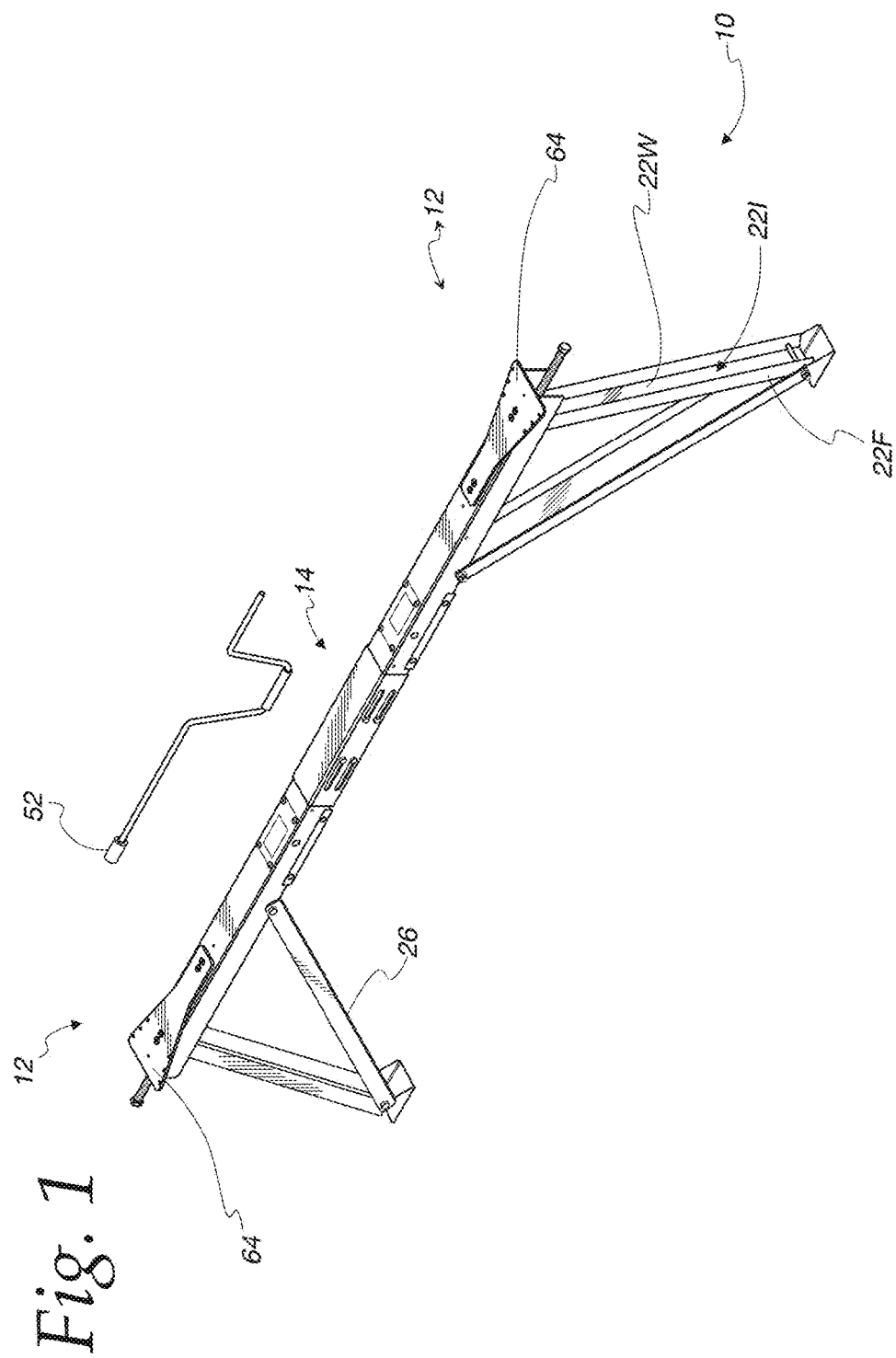

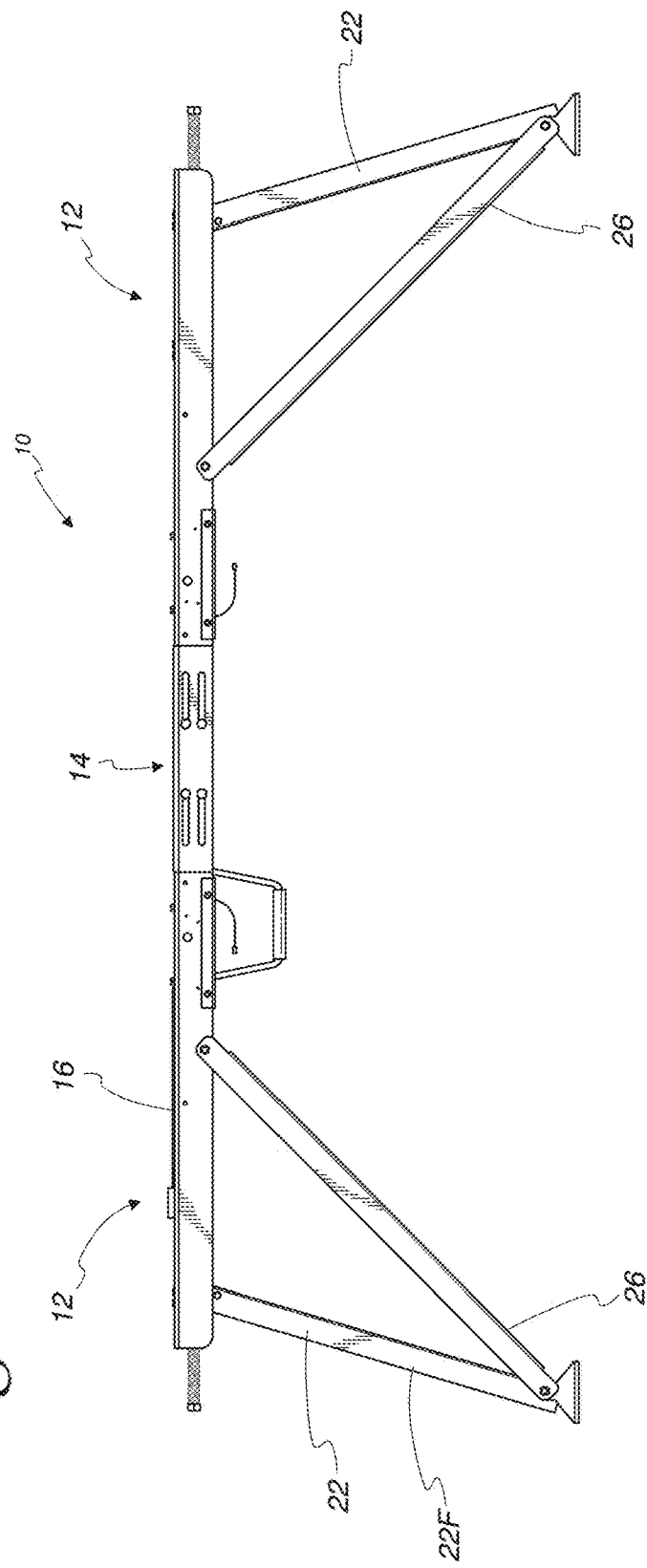

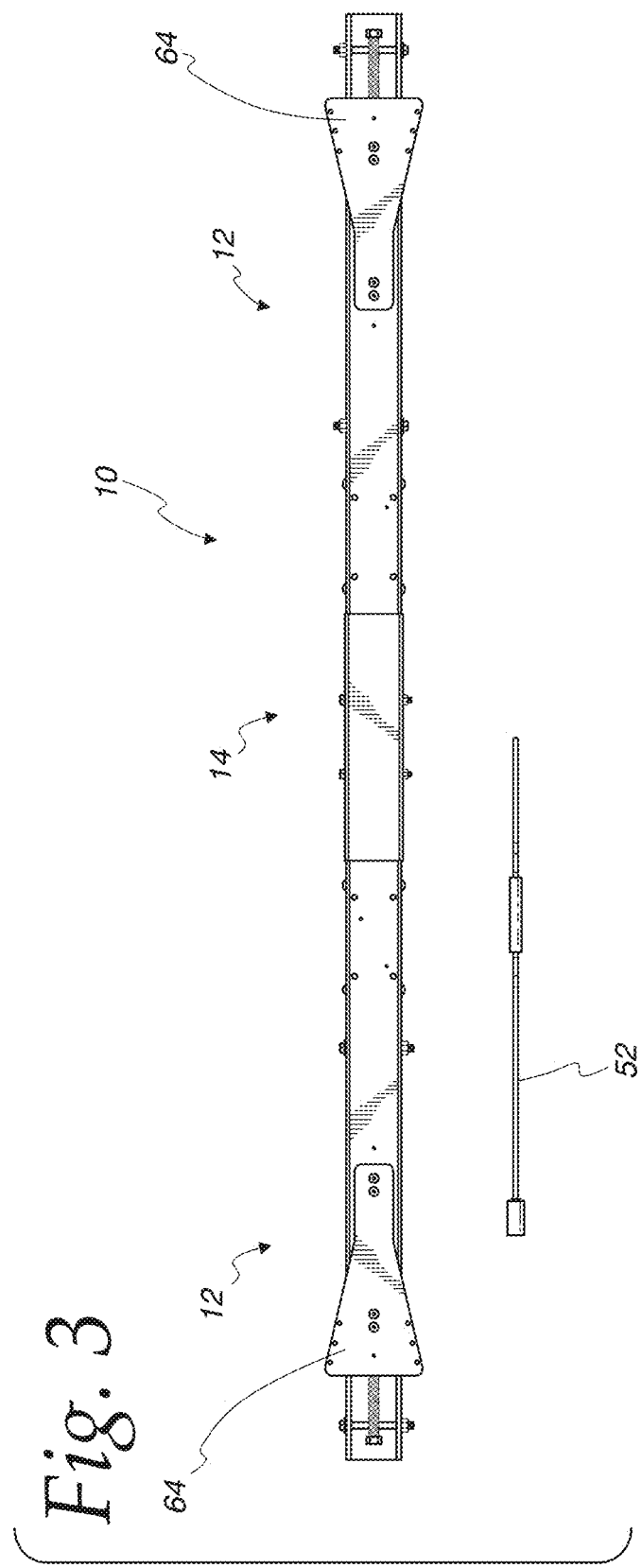

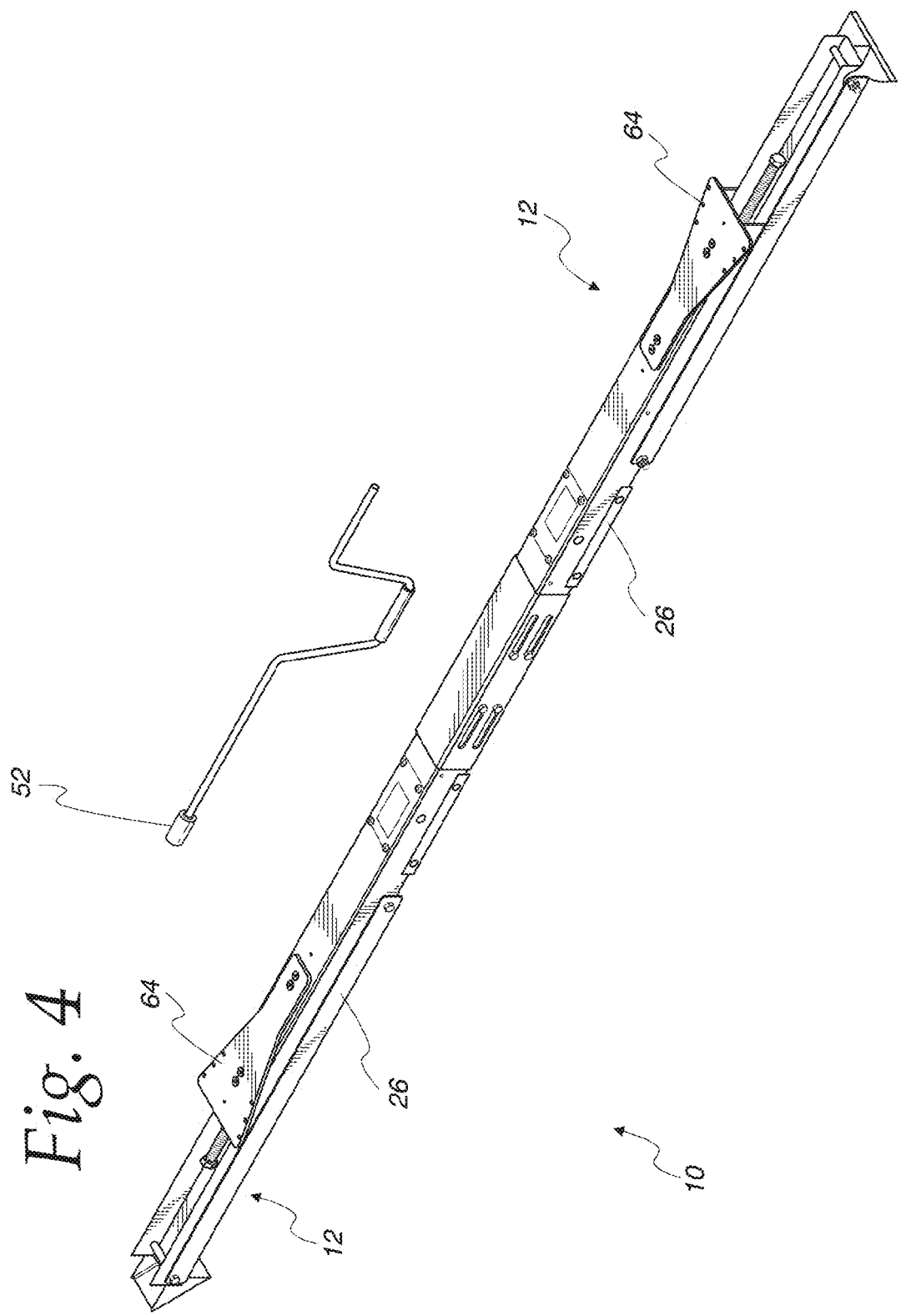

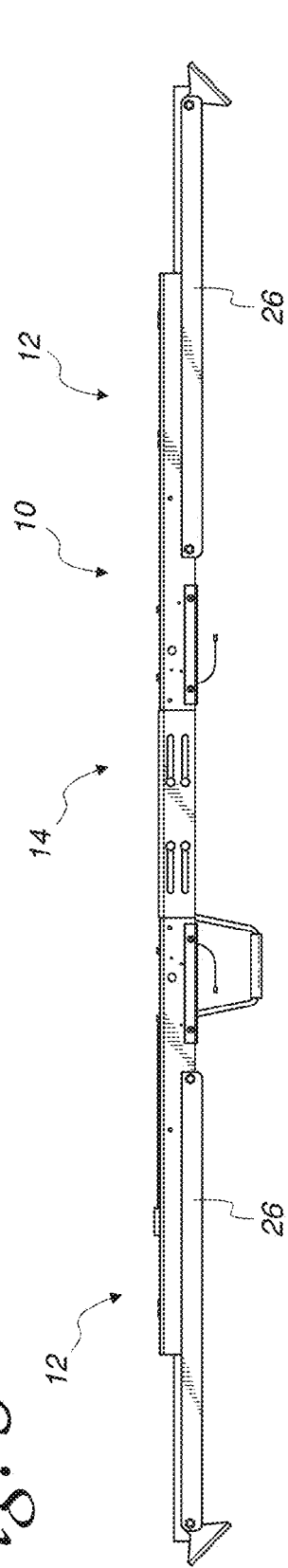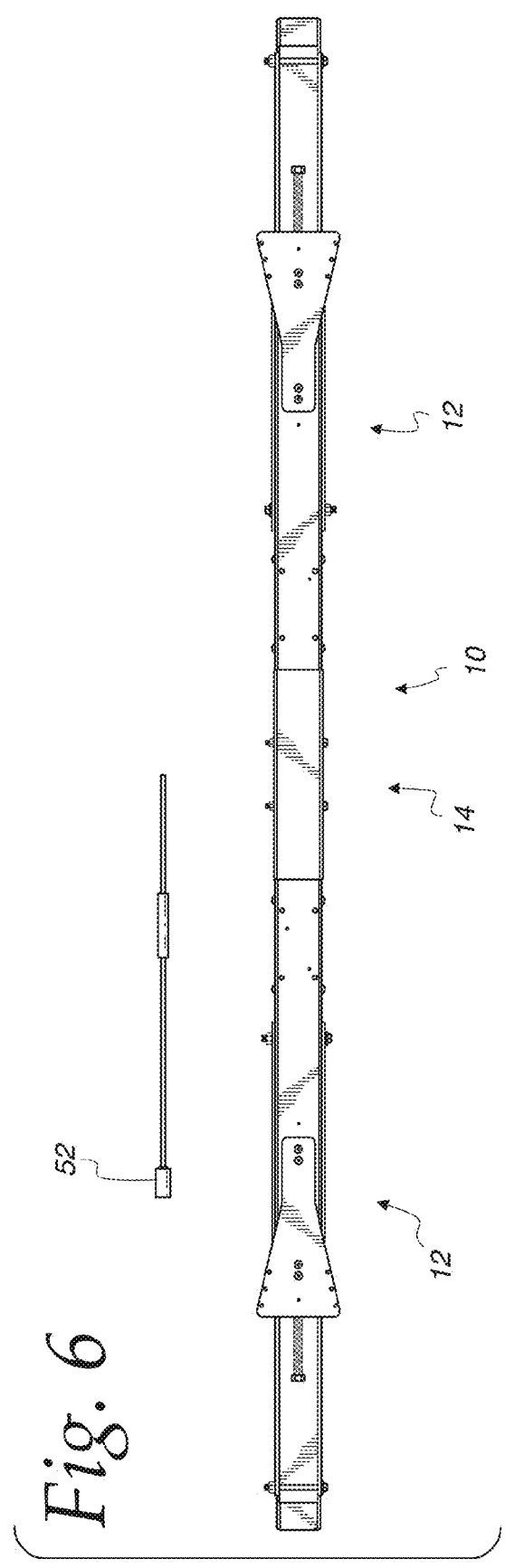

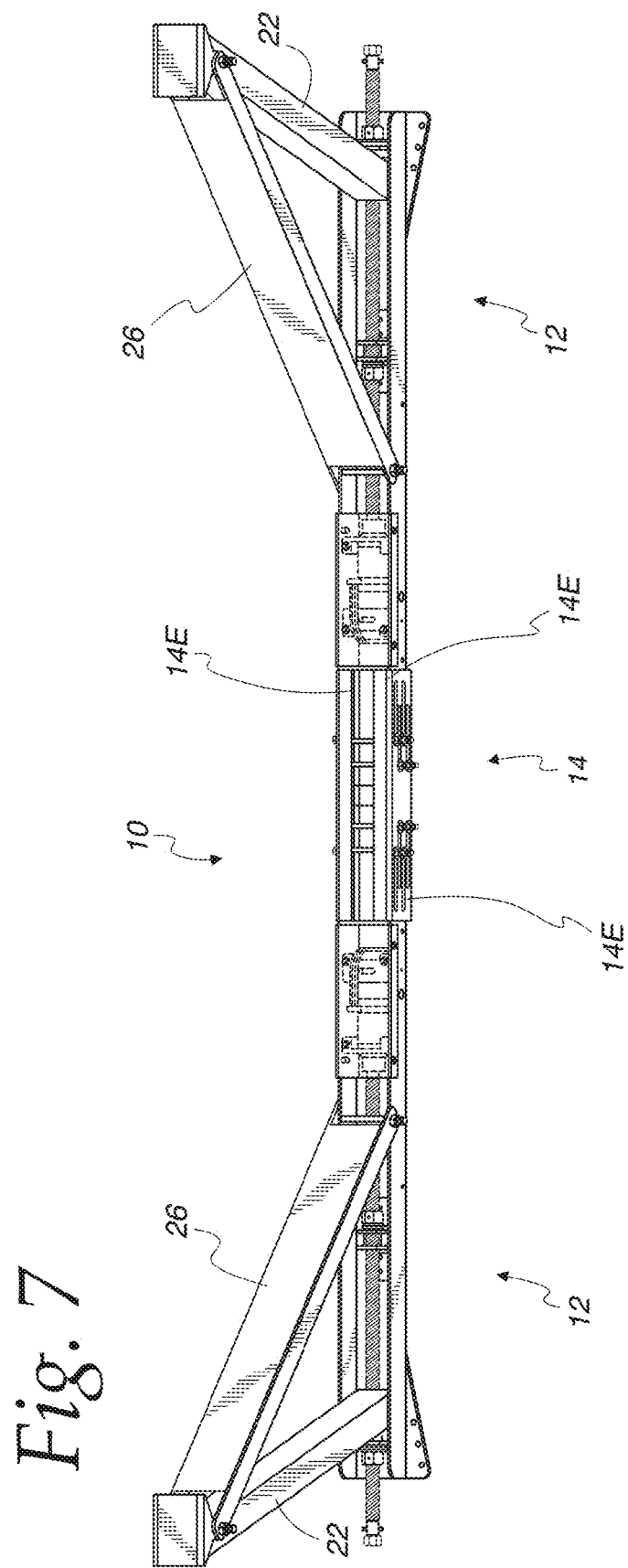

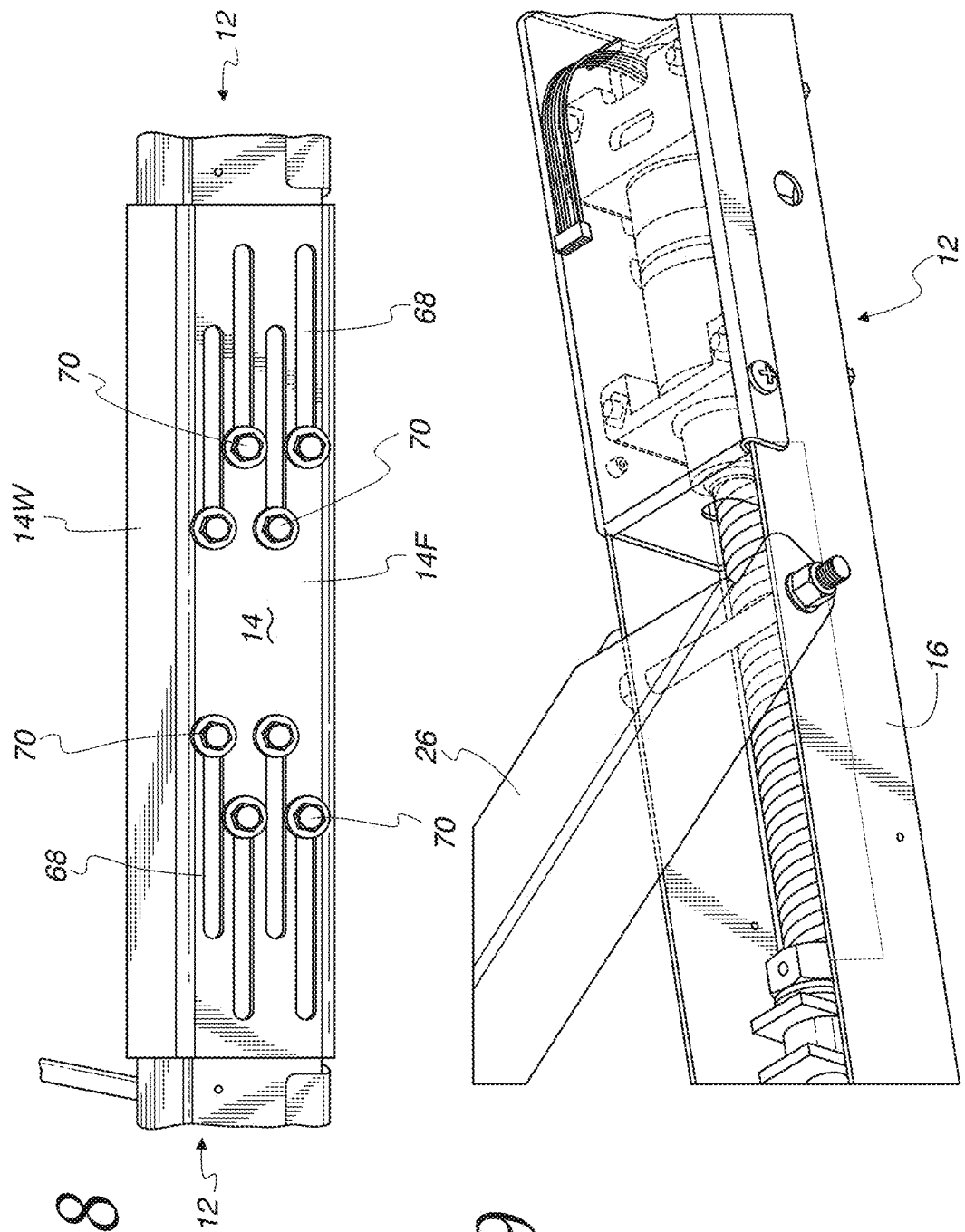

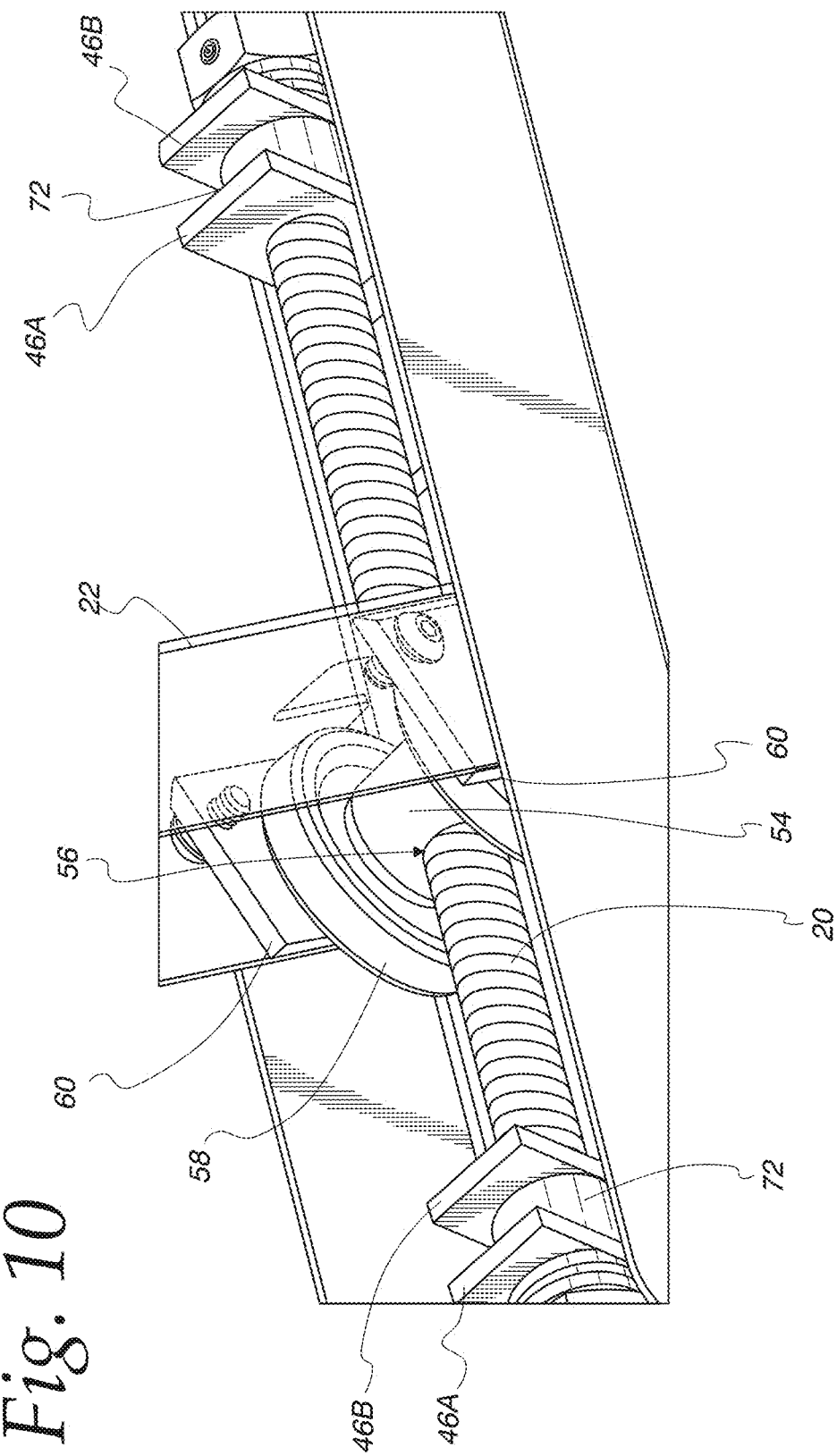

LEVELING JACK WITH DIRECT ACTUATION

CROSS-REFERENCE TO RELATED APPLICATIONS

This application claims priority as continuation-in-part to U.S. patent application Ser. No. 15/081,106, filed Mar. 25, 2016, which claims benefit of U.S. Provisional Patent Application No. 62/139,413, filed Mar. 27, 2015, and U.S. Provisional Patent Application No. 62/207,584, filed Aug. 20, 2015, and incorporates by reference the disclosures thereof in their entireties.

BACKGROUND AND SUMMARY OF THE DISCLOSURE

The present disclosure is directed to jacks, for example, jacks for leveling and stabilizing recreational vehicles and the like when parked.

BRIEF DESCRIPTION OF THE DRAWINGS

FIG. 1 is a perspective view of a jack according to the present disclosure in a deployed condition;
FIG. 2 is a side elevation view of the jack of FIG. 1;
FIG. 3 is a top plan view of the jack of FIG. 1;
FIG. 4 is a perspective view of a jack according to the present disclosure in a retracted condition;
FIG. 5 is a side elevation view of the jack of FIG. 4;
FIG. 6 is a top plan view of the jack of FIG. 4;
FIG. 7 is a bottom perspective view of the jack of FIG. 1;
FIG. 8 is a perspective view showing a detail of the jack of FIG. 1;
FIG. 9 is detail perspective view showing a detail of the jack of FIG. 1;
FIG. 10 is detail perspective view showing a detail of the jack of FIG. 1;
FIG. 30 is a side elevation view of a drive plate of the jack of FIG. 27.

DETAILED DESCRIPTION OF THE DRAWINGS

Figure 11:
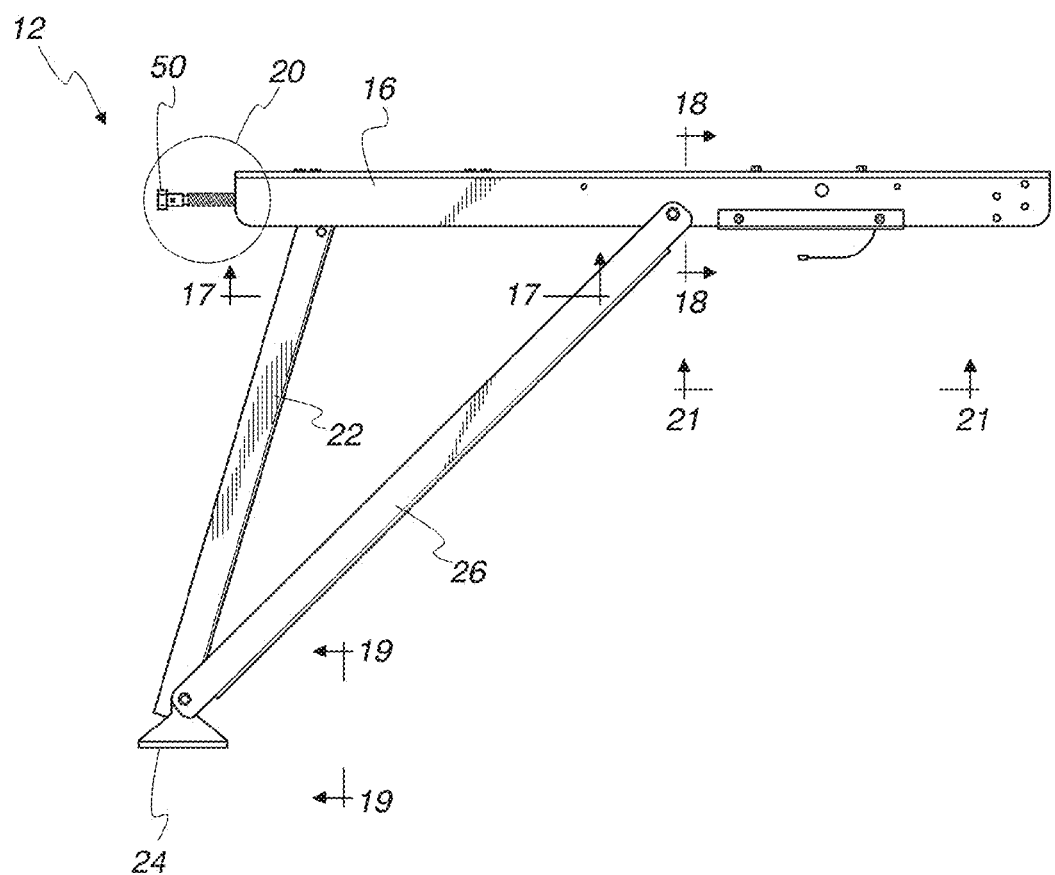
FIG. 11 is side elevation view of a lifting section of the jack of FIG. 1.
Figure 12:
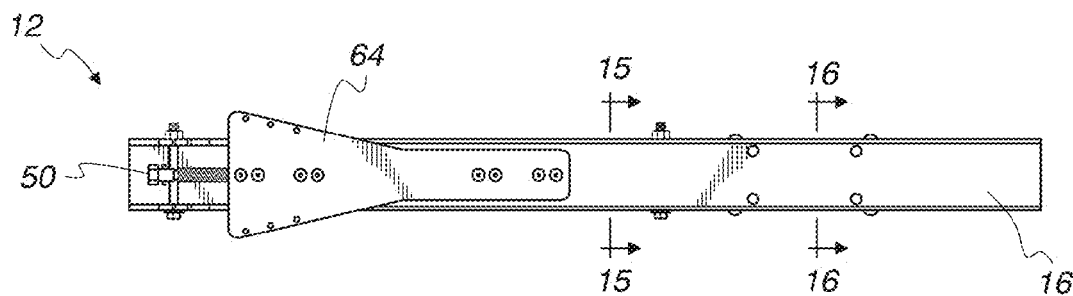
FIG. 12 is a top plan view of the lifting section of FIG. 11.
Figure 13:
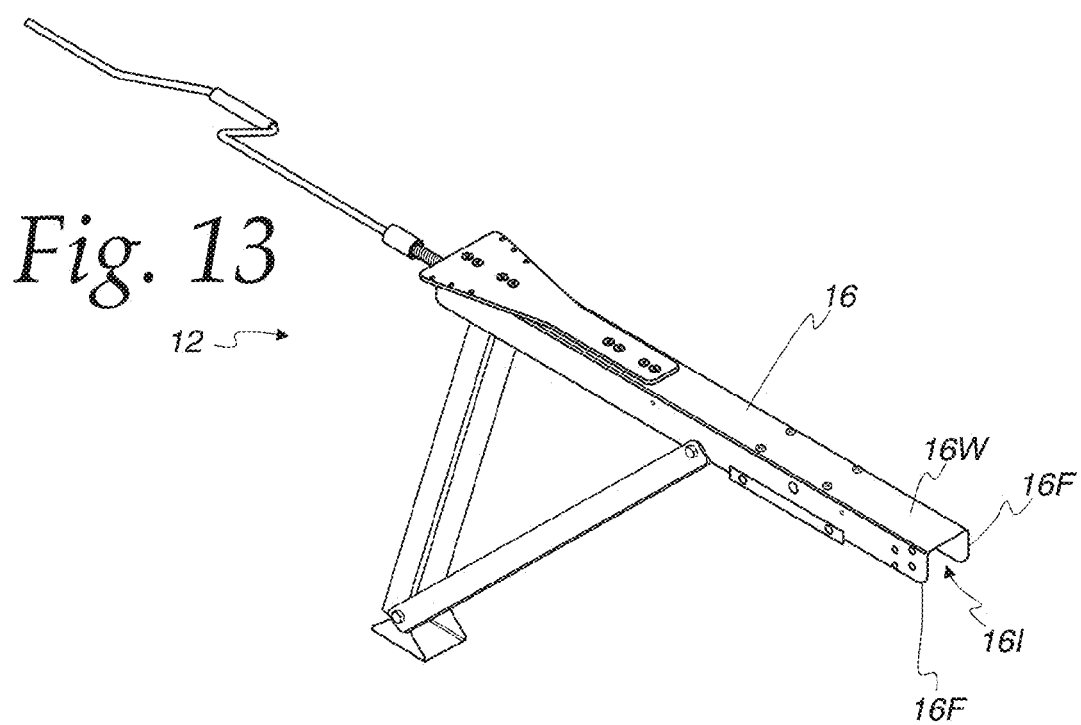
FIG. 13 is a perspective view of the lifting section of FIG. 11.
Figure 14:
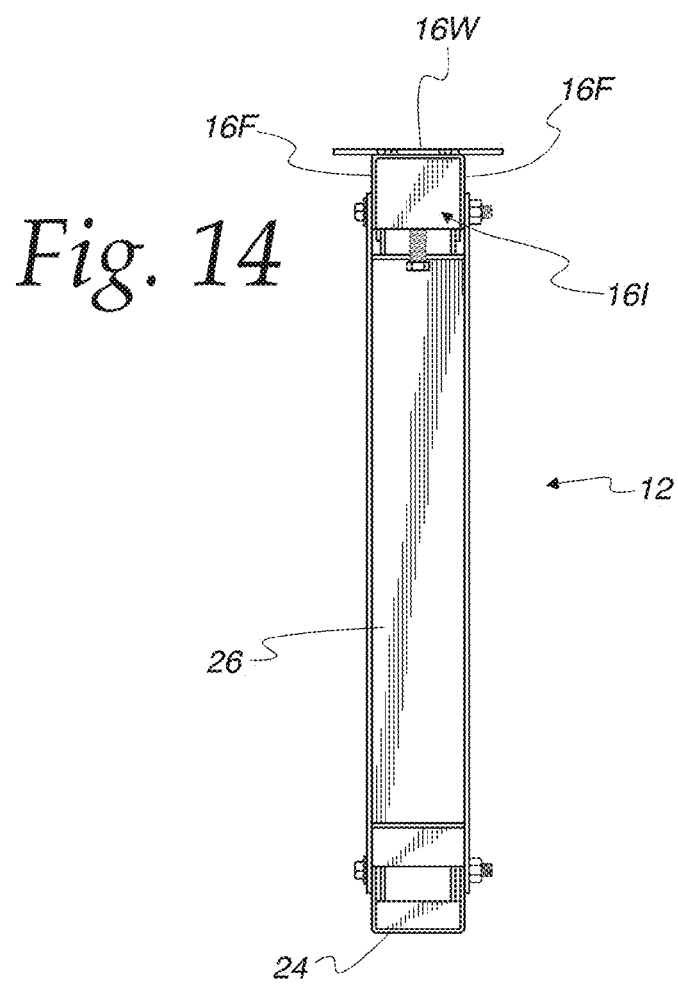
FIG. 14 is an end elevation view of the lifting section of FIG. 11.
Figure 15:
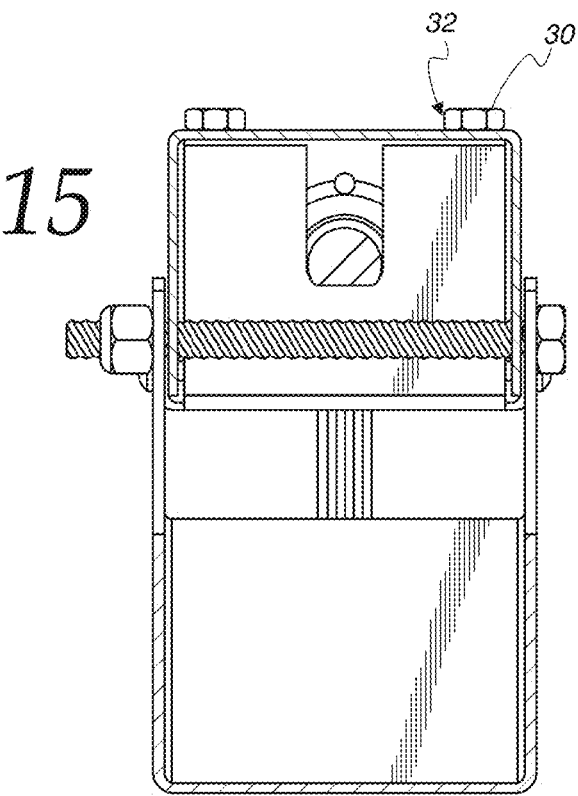
FIG. 15 is a cross section of a portion of the lifting section of FIG. 11.
Figure 16:
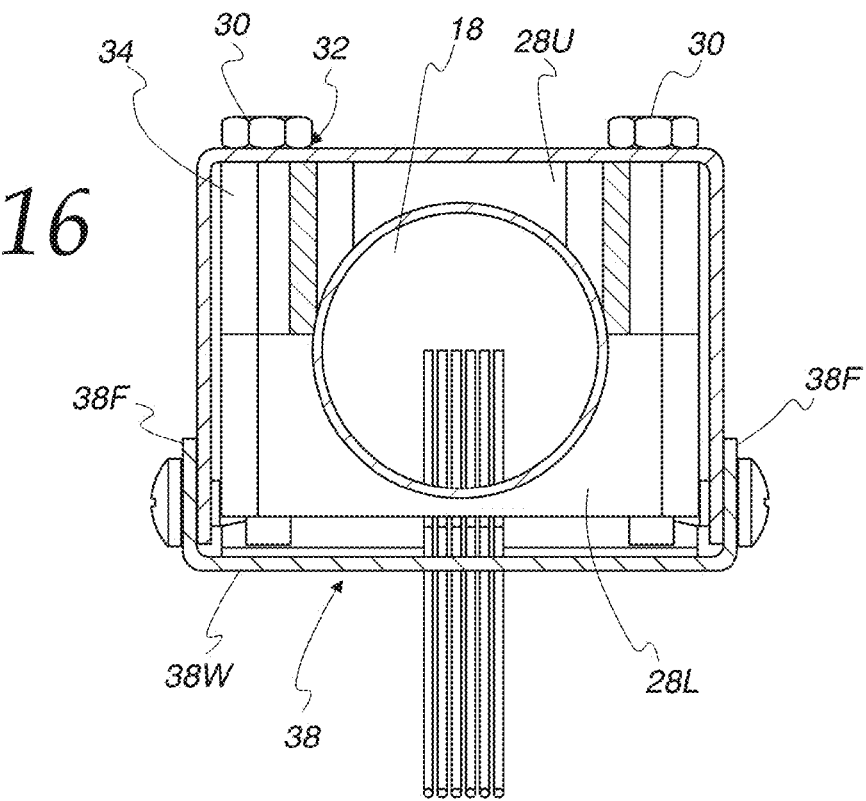
FIG. 16 is a cross section of a portion of the lifting section of FIG. 11.
Figure 17:
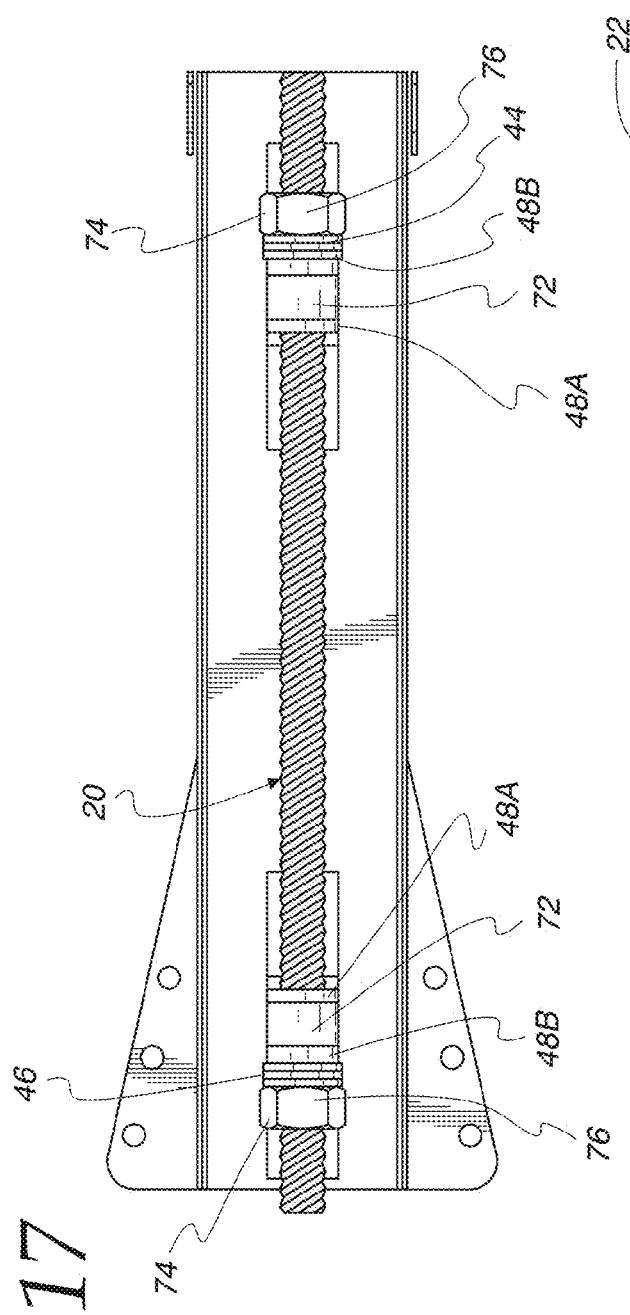
FIG. 17 is a cross section of a portion of the lifting section of FIG. 11.
Figure 19:
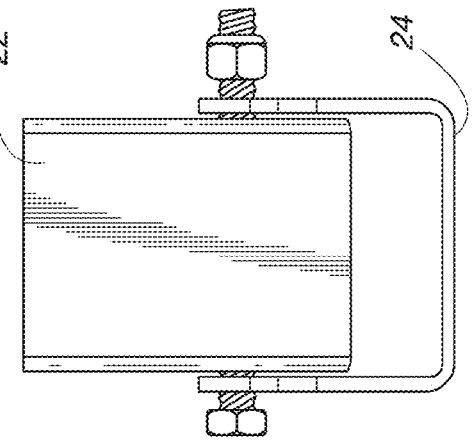
FIG. 19 is a cross section of a portion of the lifting section of FIG. 11.
Figure 18:
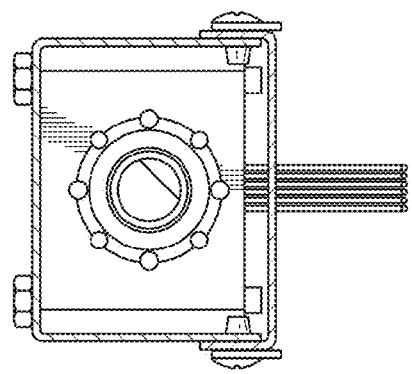
FIG. 18 is a cross section of a portion of the lifting section of FIG. 11.
Figure 20:
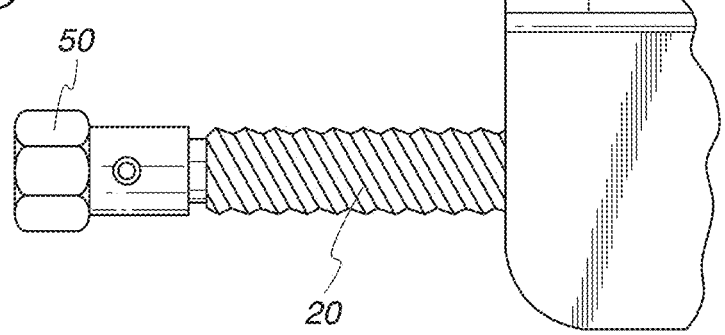
FIG. 20 is a cross section of a portion of the lifting section of FIG. 11.
Figure 21:
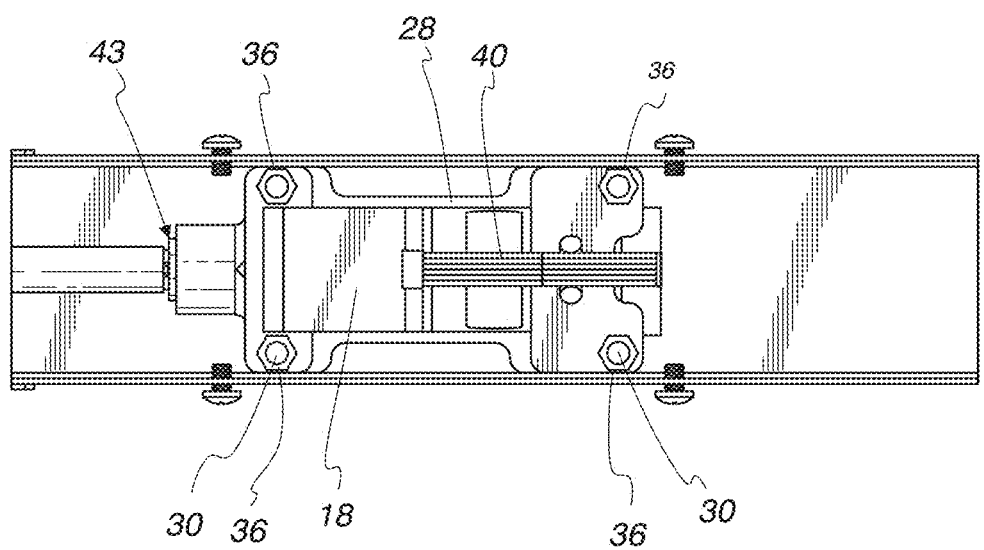
FIG. 21 is a cross section of a portion of the lifting section of FIG. 11.
Figure 22A:
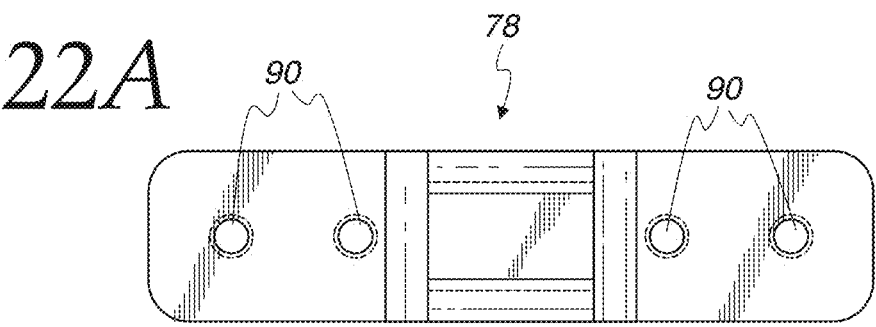
FIGS. 22A-22D are views of a guide block for a drive screw of the jack of FIG. 1.
Figure 22C:
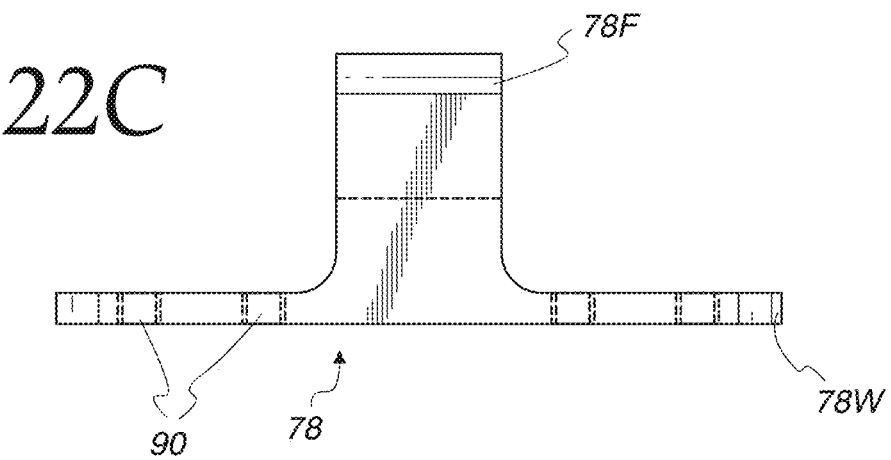
Figure 22B:
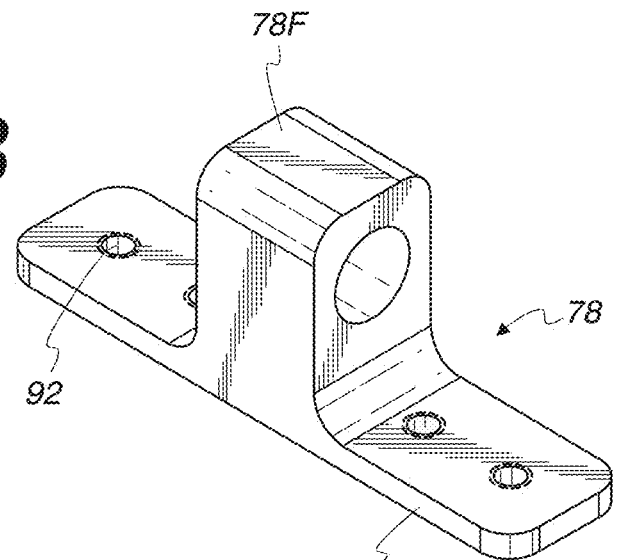
Figure 22D:
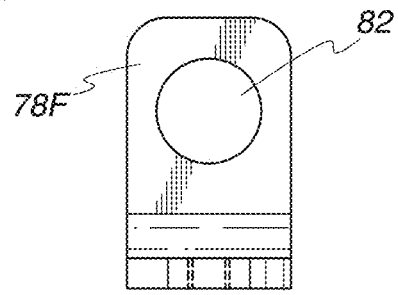
Figure 23:
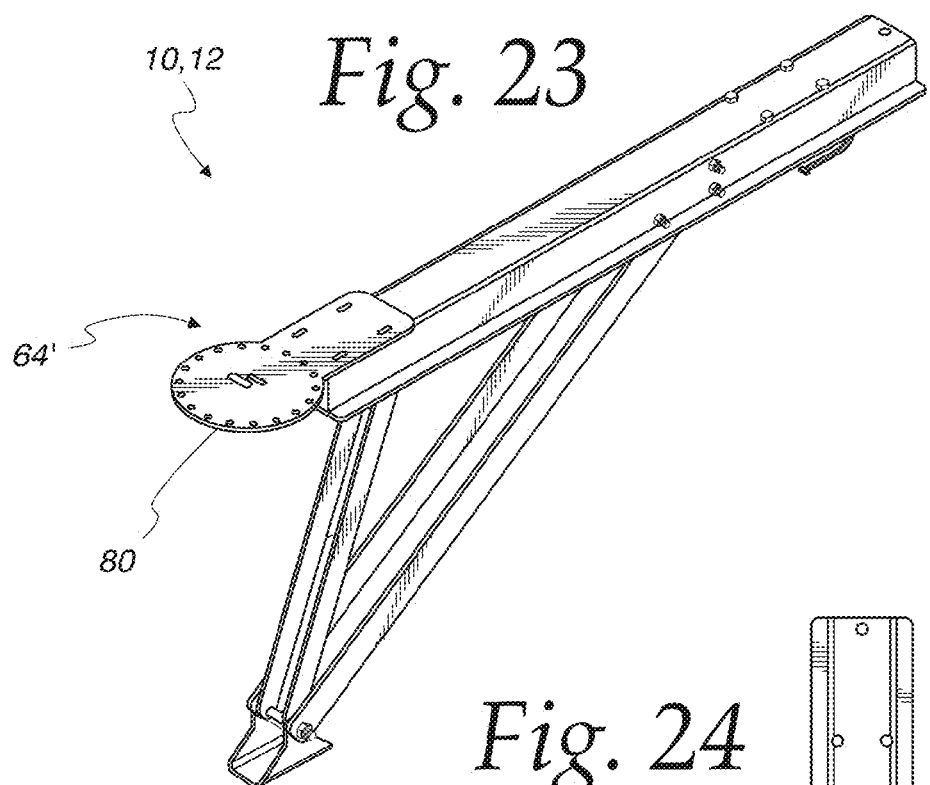
FIG. 23 is a perspective view of another jack according to the present disclosure.
Figure 24:
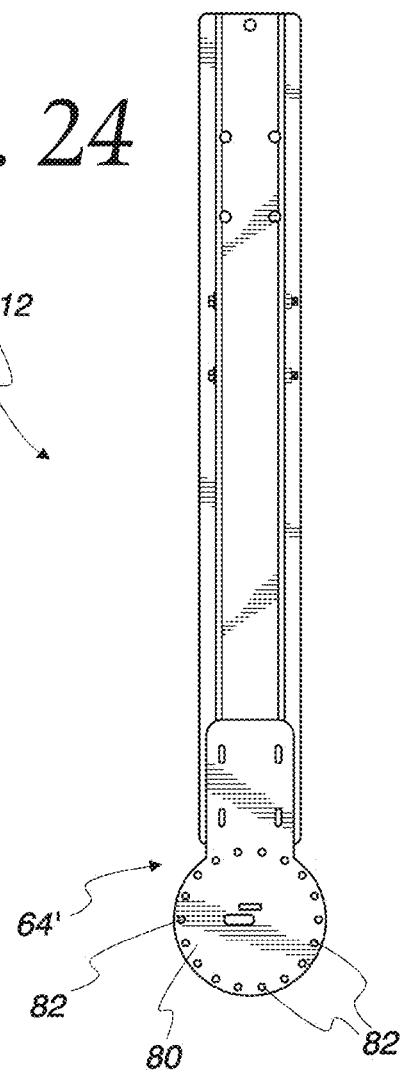
FIG. 24 is a top plan view of the jack of FIG. 23.

References herein to direction and orientation, for example, upper, lower, top, bottom, and the like, are intended to describe relative orientation and are not to be construed as absolute unless context clearly dictates otherwise.

The drawings illustrate embodiments of a leveling and stabilizing jack 10 including a first lifting (or end) section 12 and optionally including a second lifting section 12 and an intermediate member 14 connecting the first and second lifting sections. The first and second lifting sections 12 may be identical to or mirror images of each other. As such, they will be discussed interchangeably.

Each lifting section 12 includes a cross beam 16, a motor 18, a drive screw 20 rotationally engaged with the motor, an extendable and retractable leg 22 operably associated with the drive screw, a foot 24 pivotally connected to a second end of the leg, and a brace (or support arm or strut) 26 having a first end pivotally engaged with the cross beam and a second end pivotally engaged with the second end of the leg and the foot. As will be discussed further below, operation of the drive screw 20 in a first direction of rotation causes the second end of the leg 22 and the foot 24 to extend away from the cross beam 16 to a first (or extended or deployed) position, and operation of the drive screw 20 in a second direction of rotation causes the second end of the leg 22 and the foot 24 to retract toward the cross beam 16 to a second (or retracted) position. Also, operation of the drive screw 20 in a first direction causes both the leg 22 and the brace 26 to rotate through respective arcs in a first rotational direction (for example, clockwise, as viewed from the side of the left one of the two lifting sections 12 shown in FIG. 2), and operation of the drive screw in a second direction causes both the leg and the brace to rotate through respective arcs in a second rotational direction (for example, counterclockwise, as viewed from the same side of the lifting section). A mounting plate 64 may be attached to the cross beam 16 and configured for further attachment to a vehicle (not shown) or other structure to be leveled and/or stabilized by the jack.

The cross beam 16 is shown as an elongated, u-shaped channel having a web 16W and a pair of generally parallel flanges 16F. The flanges 16F extend in the same direction from opposite edges of the web. The web 16W and flanges 16F cooperate to define an interior region 16I of the cross beam 16.

The motor 18, including an armature or shaft 40, is disposed within a motor block 28 in fixed relation thereto. The motor block 28 may have an upper portion 28U and a lower portion 28L, and the motor 18 may be sandwiched between or encompassed by the upper and lower portions of the motor block.

The motor block 28 is attached to the cross beam 16 in fixed relation thereto. The motor block 28 may be partially or fully contained within the interior region of the cross beam 16. The motor block 28 may be attached to the cross beam 16 using mechanical fasteners, adhesives, or by welding. In the illustrated embodiment, the motor block 28 is attached to the cross beam 16 by motor block mounting bolts 30 extending through respective apertures 32 in the web 16W of the cross beam and apertures 34 in the upper portion 28U and lower portion 28L of the motor block, and captured thereto by nuts 36. In other embodiments, other forms and/or arrangements of threaded or unthreaded mechanical fasteners (for example, rivets) may be used to attach the motor block 28 to the cross beam 16. In further embodiments, the motor 18 may be attached directly or through brackets to the cross beam 16 in other ways, and the motor block 28 may be omitted.

A motor cover 38 may be provided to at least partially enclose the motor 18 and/or motor block 28. The motor cover 38 is shown as a generally u-shaped channel having a web 38W and a pair of parallel flanges 38F extending in the same direction from the web. The motor cover 38 may be attached to the cross beam 16, for example, using screws 36 or other fasteners extending through respective apertures in one or both of the motor cover flanges 38F and one or both of the flanges 16F of the cross beam 16.

The drive screw 20 may be, for example, an elongated, cylindrical shaft having drive threads, for example, Acme threads.

The drive screw 20 may be supported in rotational engagement by a first thrust bearing 44 relatively near the motor 18, and a second thrust bearing 46 relatively far from the motor 18. Each of the thrust bearings 44, 46 may bear against a respective drive screw guide 48. Each drive screw guide 48 may be attached to the cross beam 16, for example, to the web 16W of the cross beam. The drive screw 20, thrust bearings 44, 46, and drive screw guides 48 may be fully contained within the interior region 161 of the cross beam 16.

Each of the drive screw guides 48 is shown as a pair of metal angles 48A, 48B, each having a first leg or flange attached to the inner surface of the web 16W cross beam 16 and a second leg or flange extending generally perpendicularly from the web 16W. The first legs of the angles are shown as extending in opposite directions. The angles may be attached to the web by any suitable means. For example, the first legs of the angles 48A, 48B may be attached to the web 16W of the cross beam 16, for example, using mechanical fasteners or by welding. The second legs of the angles 48A, 48B may serve to support the drive screw 20 in rotational engagement. More specifically, the second legs of the angles 48A, 48B may include respective apertures though which the drive screw 20 may be inserted and within which the drive screw may rotate. A spacer 72 may be disposed and engaged between the second legs of the angles 48A, 48B of each drive screw guide 48. The spacer 72 may serve to preclude substantial deformation of the second legs of the angles 48A, 48B, as will become apparent from the discussion of the operation of the jack 10 below. Substantial deformation of the second legs of the angles 48A, 48B could result in burring of the drive screw 20 during operation, as will become apparent from the discussion of the operation of the jack 10 below.

The drive screw guides 48 may be configured in other ways, as well. For example, the respective pairs of angles 48A, 48B and the spacer 72 may be replaced with a guide block 78, as shown in FIGS. 22A-22D. The guide block 78 is shown as including a web portion 78W configured for attachment to the web 16W of the cross beam 16. The web 78W defines a plurality of apertures 90 configured to receive mechanical fasteners for attaching the guide block 78 to the cross beam 16. The apertures 90 could be omitted and guide block 78 could be attached to the cross beam 16 by welding, adhesive bonding, or other means. The guide block 78 also include a flange 78F extending generally perpendicularly from the web 78W. The flange 78F defines an aperture 82 configured to receive the drive screw 20 in rotational engagement. As such, the guide block 78 may serve to support the drive screw 20 in rotational engagement. The guide block 78 may be sufficiently robust to receive and withstand without substantial deformation the thrust load imparted by the respective thrust bearing 44, 46 during operation of the jack 10, as will become apparent from the discussion below.

An adjusting nut 74 may be provided in connection with each thrust bearing 44, 46, with the respective thrust bearing being located between the respective bearing support and respective adjusting nut. Each adjusting nut 74 may have an internal thread complementary to the thread of the drive screw 20. The thrust bearings 44, 46 and/or drive screw 20 may be preloaded by torqueing each adjusting nut 74 against the respective thrust bearing. A set screw 76 may be provided in connection with each adjusting nut 74 to maintain the adjusting nut in a desired position with the respect to the drive screw. The set screw 76 may thread into a corresponding aperture extending radially through the adjusting nut 74, for example, from one of its flats to its interior.

A first end of the drive screw 20 may be connected to the motor shaft 40 by a motor coupler 42. A second end of the drive screw 20 may include an optional fitting 50 configured for connection to a mating tool that could be used to operate the jack in the event the motor 18 or its power supply fails. For example, the fitting 50 could be a conventional hex head, and the mating tool could be a complementary socket attached to a speed wrench 50, power drill, or other tool. In an embodiment, the motor 18 could be omitted and the fitting 50 and mating tool could be the primary means for operating the jack.

A trunnion (or travel nut) 54 is captured on the drive screw 20 between the first and second thrust bearings 44, 46. The travel nut 54 may be a cylindrical shaft defining an aperture 56 diametrically there through. The aperture 56 may have an internal thread complementary to the thread of the drive screw 20. The travel nut 54 is rotationally and threadingly engaged with the drive screw 20.

Rollers 58 may be provided proximate opposite ends of the travel nut 54 and may be rotatably attached to the travel nut. For example, the travel nut 54 may serve as an axle for the rollers 58. The rollers 58 may be in selective or constant engagement with the inner surface (the surface facing the interior 161) of the web 16W of the cross beam 16. Such engagement may be rolling engagement. The selective or constant engagement of the rollers 58 with the inner surface of the web 16W preclude or substantially inhibit rotation of the travel nut 54 with respect to the cross beam 16, for example, while the drive nut is rotating. In an embodiment, the rollers 58 could be omitted and the travel nut 54 could be in sliding engagement with the cross beam 16.

The leg 22 is shown as an elongated, u-shaped channel having a web 22W and a pair of parallel flanges 22F extending in the same direction from opposite edges of the web.

The travel nut 54 is operably associated with the first end of the leg 22. A first bearing block 60 may be connected to a first flange 22F of the leg 22, and a second bearing block 60 may be connected to a second flange 22F of the leg 22, opposite the first bearing block. Each bearing block 60 may define an aperture (not shown) configured to receive a respective end of the travel nut 54 in rotational or non-rotational or fixed engagement therewith. For example, one or both ends of the travel nut 54 may be keyed to the respective bearing block 60. The ends of the travel nut 54 may be inserted into the apertures (not shown) of the bearing blocks 60 and the travel nut/bearing block subassembly inserted into the interior region 221 of the leg 22 and the bearing blocks 60 secured to the flanges 22F of the leg 22.

Alternatively, the bearing blocks may be omitted, and each of the first and second flanges 22F of the leg 22 may define an aperture configured to receive a respective end of the travel nut 54 in rotational or non-rotational engagement therewith. For example, the ends of the travel nut 54 may extend through corresponding apertures (not shown) proximate the first end of the leg 22. The ends of the travel nut 54 may be threaded to receive corresponding nuts (not shown). The nuts may be provided with a thread locker such as LOCTITE® to allow the nuts to become secured to the travel nut without tightening them against the flanges of the leg 22.

As set forth above, the second end of the leg 22 is pivotally connected to the second end of each of the braces 26, and the first end of each of the braces is pivotally connected to the cross beam 16. As such, as the first end of the leg 22 moves away from the second thrust bearing 46 (and corresponding drive screw guide 48) and toward the first thrust bearing 44 (and corresponding drive screw guide 48), the second end of the leg moves toward the cross beam 16 to a retracted position. Conversely, as the first end of the leg 22 moves away from the first thrust bearing 44 (and corresponding drive screw guide 48) and toward the second thrust bearing 46 (and corresponding drive screw guide 48), the second end of the leg moves away from the cross beam 16 to an extended (or deployed) position. As the second end of the leg 22 approaches the fully deployed position, the second end of the leg 22 and the foot 24 attached thereto travel through a path that is substantially perpendicular to the cross beam 16, rather than substantially arcuate.

A first of the two lifting sections 12 has been described above. The other of the lifting sections 12 may be identical to or the mirror image of the first lifting section and need not be discussed in further detail.

As set forth at the outset, the first of the lifting sections 12 may be connected to the second of the lifting sections 12 by the intermediate member 14. The intermediate member 14 may be an elongated C-shaped channel having a web 14W, a pair of generally parallel flanges 14F extending from the same side of the web 14W, and an ear 14E extending from an end of each flange 14F opposite the web 14W toward a corresponding end of the other flange. As such, the ears 14E may be generally perpendicular to the flanges 14F and generally coplanar with each other. The ears 14E could be omitted. Where provided, the ears 14E may cooperate with the web 14W to provide structural integrity to the connection of the intermediate member 14 to the lifting sections 12.

In the illustrated embodiment, the ends of the cross beams 16 of each lifting section 12 facing each other define a plurality of staggered round apertures 34. The intermediate member 14 has first and second ends, each of which defines a plurality of longitudinally-staggered corresponding slotted apertures 68. The lifting sections 12 and intermediate member 14 may be assembled with the corresponding apertures 34, 68 coaxially aligned so that fasteners 70 may be received therethrough. The slotted apertures 68 in the intermediate member 14 allow for limited adjustment of the overall length of the jack 10 prior to tightening or otherwise securing the fasteners 70.

In an embodiment including first and second lifting sections 12, the first and second lifting sections could share a common cross beam 16, and the discrete intermediate member 14 could be omitted.

A motor controller (not shown) may be provided for independently controlling the motor 18 of each of the lifting sections 12.

In operation, the leg 22 of each lifting section may be deployed by energizing the corresponding motor 18 to rotate in the first direction, causing the drive screw 20 connected to the motor shaft or armature to rotate in the same direction. The selective or constant engagement of the rollers 58 attached to the travel nut 54 preclude the travel nut from rotating significantly with respect to the drive screw 20. As such, the rotation of the drive screw 20 causes the travel nut 54 to travel away from the motor 18. Because the travel nut 54 is attached to the first end of the leg 22, the first end of the leg travels with the travel nut away from the motor 18. Because the second end of the leg 22 is pivotally connected to the second end of the brace 26, and because the first end of the brace is pivotally connected to the cross beam 16, this travel of the first end of the leg 22 causes the second end of the leg, the second end of the brace, and the foot to travel away from the cross beam 16. With the jack 10 installed on a bottom portion of a recreational vehicle or other structure, the foot 24 moves toward and into contact with the ground underneath the vehicle. During the latter part of the travel, the motion of the foot may be substantially, though not absolutely, perpendicular to the cross beam 16. When fully deployed, the leg 22 may be substantially, though not necessarily absolutely, perpendicular to the cross beam 16, and the brace 26 may provide angular support to the second end of the leg.

The motor control may be configured to stop the motor based on travel limits, motor torque, and/or motor current. For example, one or more limit switches (not shown) could be provided in operable association with the travel nut 54 and configured to cause power to the motor to be interrupted when a predetermined travel limit of the travel nut 54 has been reached. In an embodiment, a current sensor (not shown) could monitor motor current and cause power to the motor 18 to be interrupted when the motor current reaches or exceeds a predetermined threshold. In an embodiment, a torque sensor (not shown) could monitor torque output of the motor 18 or the drive screw 20 and cause power to the motor to be interrupted when a predetermined torque is reached or exceeded.

Because the motor control may be configured to control the motor 18 of each of the lifting sections 12 independently, the leg 22 and foot 24 of one of the lifting sections may be deployed to a greater or lesser extent than those of the other of the lifting sections 12.

The leg 22 of each lifting section may be retracted by energizing the corresponding motor 18 to rotate in the second direction, causing the drive screw 20 connected to the motor shaft or armature to rotate in the same direction. The selective or constant engagement of the rollers 58 attached to the travel nut 54 preclude the travel nut from rotating significantly with respect to the drive screw 20. As such, the rotation of the drive screw 20 causes the travel nut 54 to travel toward the motor 18. Because the travel nut 54 is attached to the first end of the leg 22, the first end of the leg travels with the travel nut away toward the motor 18. Because the second end of the leg 22 is pivotally connected to the second end of the brace 26, and because the first end of the brace is pivotally connected to the cross beam 16, this travel of the first end of the leg 22 causes the second end of the leg, the second end of the brace, and the foot to travel toward the cross beam 16.

The motor control may be configured to stop the motor based on travel limits, motor torque, and/or motor current. For example, one or more limit switches (not shown) could be provided in operable association with the travel nut 54 and configured to cause power to the motor to be interrupted when a predetermined travel limit of the travel nut 54 has been reached. In an embodiment, a current sensor (not shown) could monitor motor current and cause power to the motor 18 to be interrupted when the motor current reaches or exceeds a predetermined threshold. In an embodiment, a torque sensor (not shown) could monitor torque output of the motor 18 or the drive screw 20 and cause power to the motor to be interrupted when a predetermined torque is reached or exceeded. In an embodiment, the motor control could be configured to stop the motor 18 when the leg 22 and foot are fully retracted. In this state, at least a portion of the leg 22 may nest within the cross beam 16, and at least a portion of the cross beam may nest within the brace 26. Alternatively, the cross beam 16, leg 22, and brace 26 could be configured such that at least portions of both the leg and brace may nest within the cross beam in the foregoing retracted state.

In operation, the drive screw guides 48 (including the first and second angles 48A, 48B and intermediate spacer 72) or guide blocks 78 may limit the linear travel of the travel nut 54. As such, the travel nut 54 may bear against and impart a thrust load against the drive screw guides 48 or guide blocks 78. The drive screw guides 48 or guide blocks 78 may transmit this load or a portion thereof to the respective thrust bearings 44, 46.

In an embodiment, a level sensor (not shown) may be provided and operably associated with the motor control. In such an embodiment, the motor control could independently control operation of the motors 18 of the respective lifting sections 12 in a manner that results in the jack 10, including the intermediate member 14 and the cross beams 16, and/or structure to which it may be attached being substantially level when the power to the respective motors is interrupted. Put another way, the jack may be operated so that the legs 22 of the respective lifting sections 12 may extend to different extents so as to generally level the jack 10 and the structure to which the jack may be attached.

In an embodiment, the jack may have only a single lifting section 12. In such an embodiment, the other lifting section 12 would be omitted and the intermediate member 14 could be omitted, as well. Also in such an embodiment, a second mounting plate, for example, a second mounting plate 64 could be attached to another portion, for example, the opposite end, of the cross beam 16 (or to a portion of the intermediate member 14, if maintained). Numerous ones of such jacks having a single lifting section 12 could be attached to various portions of a structure to be supported, leveled, and/or stabilized thereby. For example, a first such jack could be installed proximate a first corner of a vehicle, a second such jack could be installed proximate a second corner of the vehicle, and so on. The individual jacks could interface with a motor controller and/or level sensor, as discussed above.

In another such embodiment, the mounting plate 64 described above could be replaced with a mounting plate 64' having a circular portion 80 configured for attachment to a vehicle or other structure. One example of such a mounting plate 64' is shown in FIGS. 23-26. The circular portion 80 of the mounting plate 64' could be provided with a plurality of apertures 82 about its periphery in a circular or other non-linear arrangement. In an embodiment, the apertures 82 could be configured so that at least some of them may be selectively aligned with corresponding apertures on the vehicle or other structure. For example, corresponding apertures could be provided on a frame member of the vehicle or other structure. Mechanical fasteners could be inserted through respective apertures to secure the mounting plate 64' to the vehicle or structure. A second mounting plate 64 or 64' could be provided at or near the other end of the cross beam 16. The mounting plate(s) 64, 64' could be attached to the cross beam 16 by any suitable means, for example, welding or using mechanical fasteners.

Figure 25:
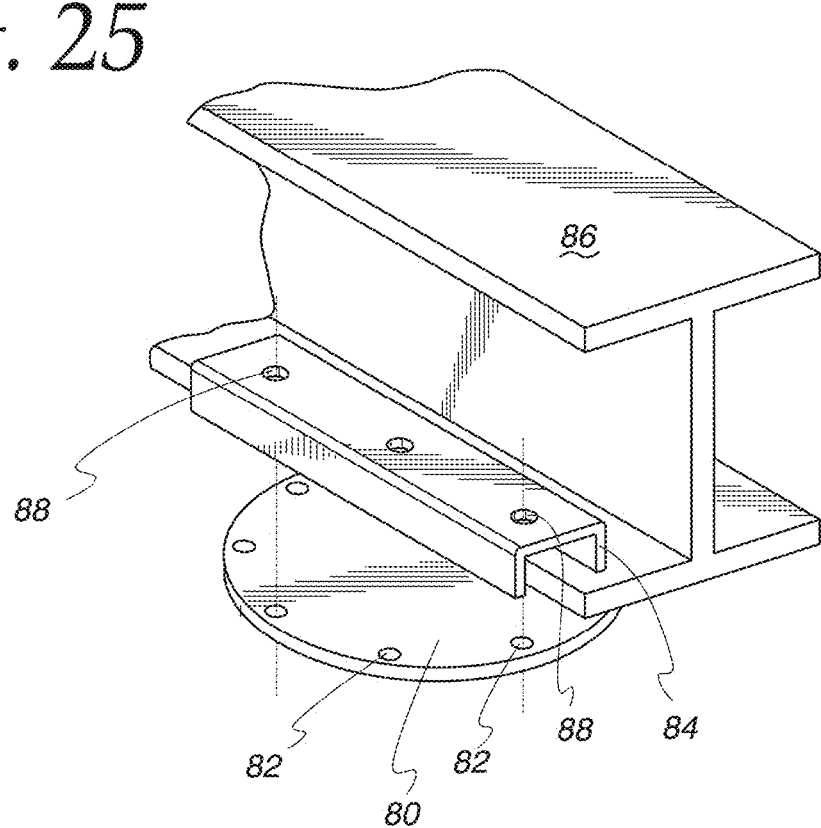
FIG. 25 is a perspective view of a mounting plate of the jack of FIG. 23 and mating bracket attached to a cross member of a frame of a vehicle.
Figure 26:
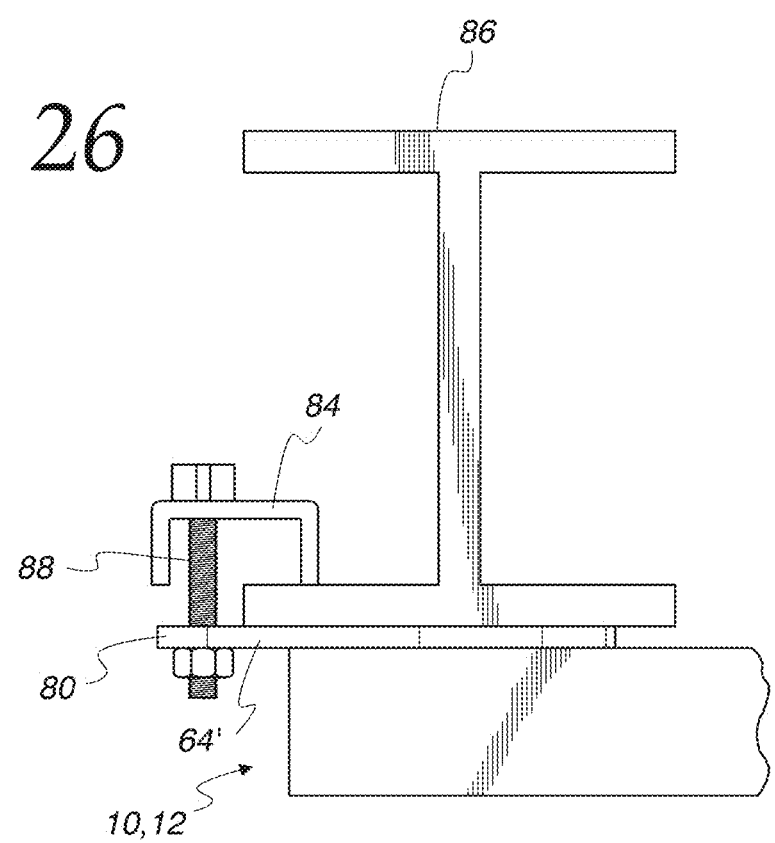
FIG. 26 is a side elevation view of a mounting plate of the jack of FIG. 23 and mating bracket attached to a cross member of a frame of a vehicle.

In an embodiment, the mounting plate 64' could be attached to a portion of the vehicle or structure using a bracket 84, for example, as shown in FIGS. 25 and 26. The bracket 84 is shown as a length of channel having a web and a pair of parallel flanges extending from respective sides of the web. The web may define one or more apertures 88. One of the flanges of the bracket 84 and a surface of the mounting plate 64' may cooperate to sandwich or otherwise capture there between a portion of a vehicle or structure, for example, a flange of an I-beam 86 of a frame of a vehicle to which the jack 10 is to be attached. One or more fasteners, for example, threaded fasteners 88 or rivets, may be inserted through corresponding apertures 82 in the mounting plate 64' and apertures 88 in the bracket 84 and tensioned to secure the mounting plate 64' to the structure.

Embodiments of a jack 10 including two lifting sections 12 typically would be attached to an RV or other structure with the cross beams 16 generally parallel to a width or length of the structure (although it could be attached in other orientations, as well). Embodiments of a jack 10 including only a single lifting section 12 may be more readily attached to the structure in other orientations. For example, a jack 10 including only a single lifting section may be more readily attached to an RV near a corner thereof and oriented at an angle (for example, 45 degrees) to the length and width of the vehicle. So oriented, the jack could provide both lateral and longitudinal support for the RV. The configuration of the mounting plate 64' may provide more installation options than the mounting plate 64 in such an application. More specifically, the arrangement of apertures 82 in the circular portion 80 of the mounting plate 64' allows the mounting plate 64' to be attached to the RV or other structure in numerous angular orientations with respect to the RV or other structure.

In an embodiment, the electric motor and drive screw could be replaced with another form of drive mechanism, for example, a hydraulic or pneumatic actuator connected to the travel nut and configured to displace the travel nut between endpoints similar to those described above.

FIGS. 27-31 show another embodiment of a leveling and stabilizing jack 110. The jack 110 is in many respects similar to the jack 10. For example, the jack 110 includes a first lifting (or end) section 112. The jack 110 may include a second lifting section 112 that may be substantially similar to the first lifting section 112. In such an embodiment, the second lifting section 112 may be joined to the first lifting section 112 by an intermediate section 114 or otherwise. For example, the second lifting section 112 may be connected directly to the first lifting section 112.

The first lifting section 112 is similar in many respects to the first lifting section 12. For example, the first lifting section 112 includes a cross beam 116, a motor 118, a drive screw 120 rotationally engaged with the motor, an extendable and a retractable leg 122 having a first end operably associated with the cross beam via a trunnion 154 and also operably associated with the drive screw, a foot 124 pivotally connected to a second end of the leg, and a brace (or support arm or strut) 126 having a first end pivotally engaged with the cross beam and a second end pivotally engaged with the second end of the foot. Operation of the jack 110 generally is similar to operation of the jack 10.

The cross beam 116 is shown as an elongated U-shaped channel having a web 116W and a pair of generally parallel flanges 116F. The flanges 116F extend in the same direction from opposite edges of the web 116W. The web 116W and flanges 116F cooperate to define an interior region 116I of the cross beam 16. A stiffener 116S extends outwardly from the end of each of the flanges 116F opposite the web 116.

Figure 27:
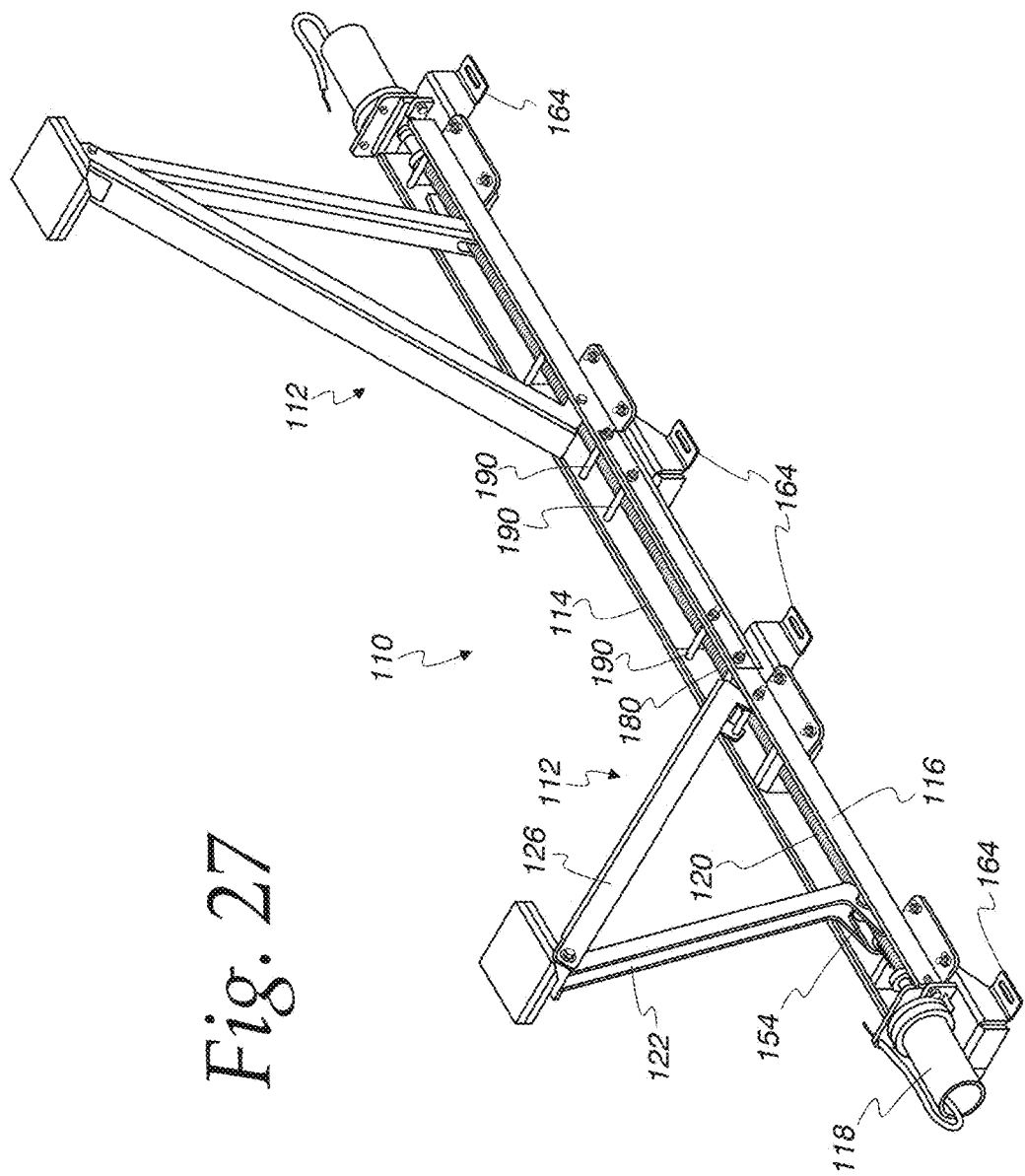
FIG. 27 is a bottom perspective view of a further embodiment of a jack according to the present disclosure.

A plurality of cross ties 190 extend between opposing flanges 116F of the cross beam 116. The cross ties 190 may be configured and located as desired to preclude or mitigate splaying of the flanges 116F away from each other when a load is applied to the jack 110. Typically, the cross ties 190 would be located relatively near the free ends of the flanges 116F opposite the web 116W (and relatively near the stiffeners 116S, when provided), as best shown in FIG. 27. If desired, one or more cross ties 190 could be located nearer the web 116W than the free ends of the flanges 116F. The cross ties 190 may be embodied as mechanical fasteners, for example, bolts extending through corresponding apertures in the flanges 116F and corresponding nuts to secure the bolts in place.

One or more cross bars 192 may be disposed between opposing flanges 116F of the cross beam 116. In the illustrated embodiment, a first cross bar 192A is disposed between the flanges 116F of the cross beam 116 at or near a free end thereof, and a second cross bar 192B is disposed between the flanges 116F inboard of the free end, between the free end of the cross beam and the point of attachment of the brace 126 to the cross beam. Other embodiments could include more or fewer cross bars 192, located as desired.

Figure 28:
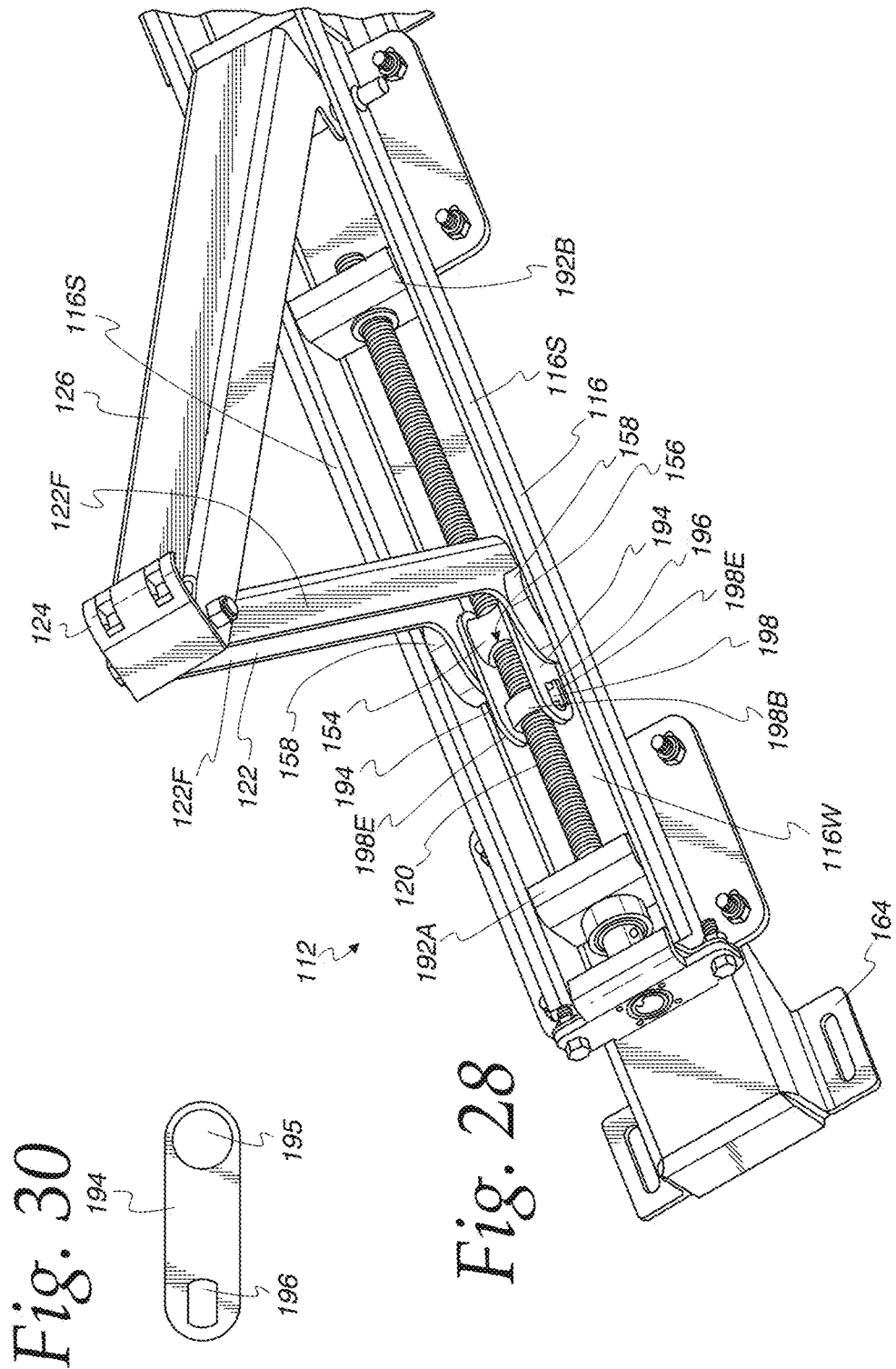
FIG. 28 is a bottom perspective view of a portion of the jack of FIG. 27.
Figure 29:
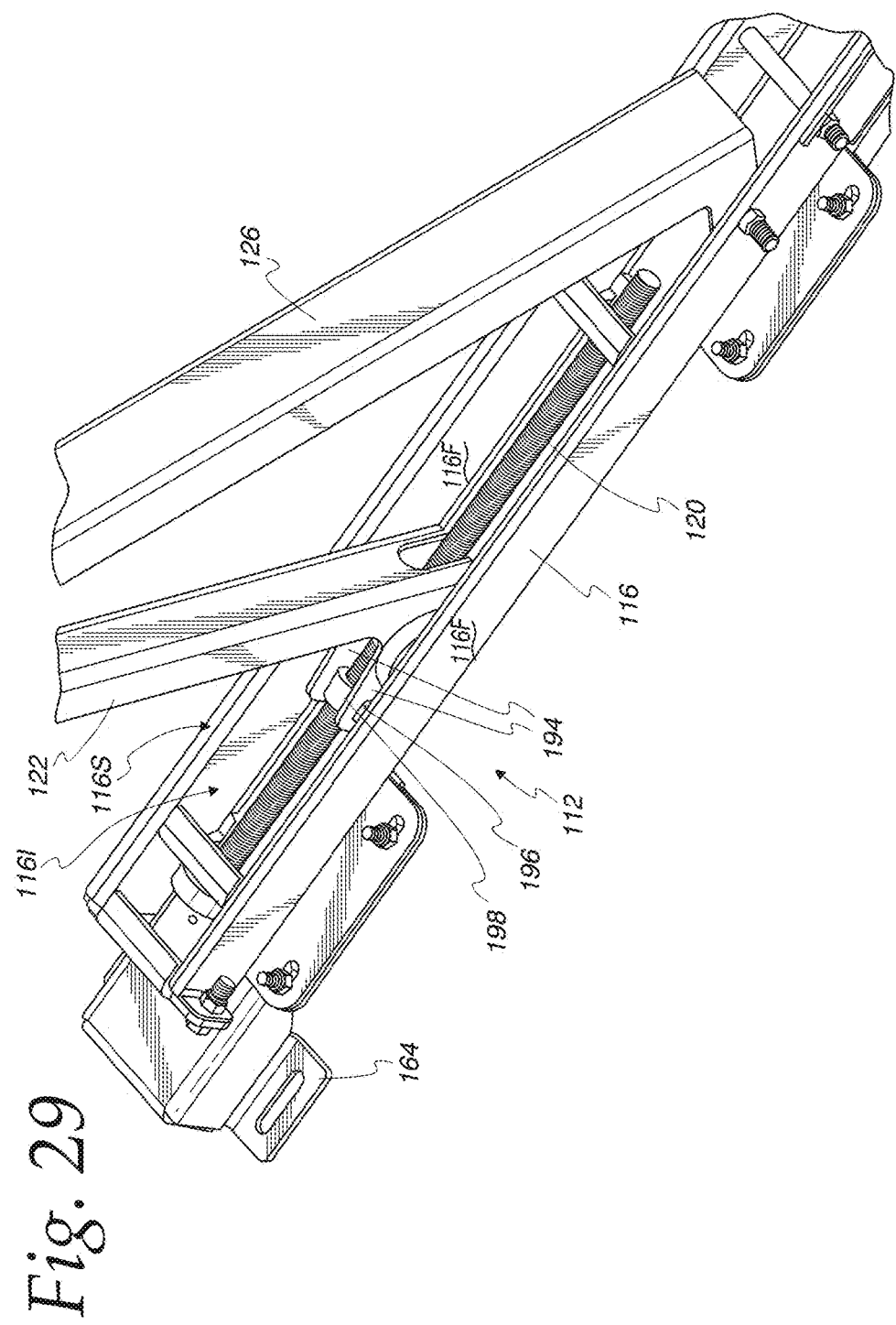
FIG. 29 is another bottom perspective view of a portion of the jack of FIG. 27.

The cross bars 192 may be embodied as plates, each having a pair of opposed edges in substantial contact with the flanges 116F. As best shown in FIG. 28, the cross bars 192 also may have an edge in contact with or near the web 116W. In the illustrated embodiment, each cross bar 192 defines an aperture configured to receive the drive screw 120. One or both of such apertures may be oversized (substantially larger in diameter than the drive screw 120) to preclude or mitigate the likelihood of inadvertent engagement of the drive screw 120 with the respective cross bar 192. Alternatively, one or both of such apertures may be configured to support the weight of the drive screw without binding with the drive screw. Such a configuration may tend to mitigate a tendency for the drive screw to bow, particularly when the jack 110 is loaded. In an embodiment, the apertures may be oversized and bushings may be received therein for supporting the drive screw 120.

In the illustrated embodiment, the cross bars 192 are located near one or more corresponding cross ties 190. In this embodiment, the cross ties 190 may be tensioned to provide sufficient compressive force between the flanges 116F and the cross bars 192 to hold the cross bars in place. Alternatively, the cross bars 192 could be welded to one or both of the flanges 116F and/or the web 116W of the cross beam 116 or otherwise secured to the cross beam 116.

Whereas the motor 18 of the jack 10 is disposed within the interior region 161 of the cross beam 16 thereof and connected directly to the drive screw 20 thereof, the motor 118 of the jack 110 is disposed outside the cross beam 116. The motor 118 is shown as having an armature or motor shaft coaxial with the drive screw 120. In an embodiment, the motor 118 could be parallel to and offset from the drive screw 120 and coupled thereto via an intervening transmission (not shown). Such a transmission could include first and second gears, for example pinion gears, disposed on corresponding first and second parallel shafts. In another embodiment, the motor 118 could be perpendicular to the drive screw 120 and coupled thereto via an intervening transmission (not shown). Such a transmission could include first and second gears, for example, bevel gears, disposed on perpendicular shafts.

The motor 118 and/or the transmission may be mounted to or supported by the cross beam 116 using a suitable bracket. In the embodiment illustrated in FIG. 27, the motor 118 is attached to a mounting bracket 164 that is in turn attached to the cross beam 116. The mounting bracket 164 may be configured as a spacer having a mounting surface offset from the web 116W of the cross beam 116. This allows for provision of a space between the cross beam 116 and a vehicle to which the jack 110 may be mounted. The space may be used to accommodate cables, hoses, or the like.

The transmission, where provided, may include gears that are self-locking. That is, the gears may be selected to resist or preclude the motor 118 from being back-driven by the drive screw 120. This design may preclude the jack 110 from creeping from a deployed state toward a retracted state based on forces applied thereto by a load, for example, a recreational vehicle, being supported thereby. The self-locking characteristic may be effected by appropriate selection of gear ratio, gear type, gear profile, and/or by other suitable means. The transmission may have an output keyed to the drive screw 120. The motor 118 and/or transmission may be configured for installation to and removal from the jack 110 with no or minimal disassembly of other portions the jack.

Whereas the trunnion 54 of the jack 10 defines an internally-threaded aperture 56 configured to threadingly engage with the threads of the drive screw 20, the trunnion 154 of the jack 110 defines an aperture 156 that receives but does not necessarily engage with the drive screw 120. The aperture 156 may be substantially larger than the outer dimension of the drive screw 120 to preclude or mitigate the likelihood of the drive screw 120 from engaging the trunnion 154.

The trunnion 154 supports first and second rollers 158 in rotating engagement. The rollers 158 are configured to rotate about the trunnion 154 and roll on the web 116W of the cross beam 116 when the jack 110 is operated. A bearing or bushing (not shown) may be interposed between the trunnion 154 and either or each of the rollers 158.

First and second drive plates 194 define first apertures 195 proximate first ends thereof and second apertures 196 proximate second ends thereof. The first aperture 195 of the first drive plate 194 is generally circular and receives a first end of the trunnion 154. Similarly, the first aperture 195 of the second drive plate 194 is generally circular and receives a second end of the trunnion 154. As such, the first ends of the first and second drive plates 194 are pivotally connected to the trunnion 154 proximate the first and second ends thereof, outboard of the aperture 156 defined by the trunnion. The second apertures 196 of the drive plates 194 are generally rectangular and are configured to receive first and second ears 198E of a drive nut 198, as will be discussed further below. The first and second drive plates 194 may be pivotally captured by the trunnion between the flanges 122F of the leg 122.

The drive nut 198 includes a generally annular body 198B and first and second generally planar ears 198E extending diametrically from the outer surface of the body. Each of the first and second ears 198E is generally T-shaped, with the stem of the "T" extending from the body 198B of the drive nut 198 and the cross bar of the "T" parallel to the body. The ears 198E and the second apertures 196 of the drive plates 194 are configured so that the ears can be freely inserted into and removed from the second apertures of the drive plates. The interface between the ears 198E and the drive plates 194 may be sufficiently loose to allow for some amount of float between the drive nut 198 and the drive plates 194 so that the drive nut and the drive plates may rotate a few degrees or more or less with respect to each other. The cross bar of the "T" may be thicker than the stem of the "T" to better enable such rotation or float while mitigating the likelihood of the drive nut 198 becoming inadvertently disengaged from the drive plates 194.

The body 198B of the drive nut 198 defines a threaded aperture configured to threadingly engage with the drive threads of the drive screw 120.

As shown, the jack 110 may also include a second lifting section 112 opposite the first lifting section 112. The second lifting section 112 may be configured as the mirror-image of the first lifting section 112. As shown, the first and second lifting sections 112 may share a common cross beam 116. Alternatively, first and second lifting sections 112 may be discrete assemblies joined together by an intermediate member similar to intermediate member 14 of the jack 10.

The foregoing embodiments are illustrative and not limiting. The embodiments could be modified as may be desired, yet fall within the scope of the appended claims. For example, without limitation, features disclosed in connection with a given embodiment could be incorporated into another embodied to the extent possible.

The invention claimed is:

1. A jack comprising:
a first lifting section, the first lifting section comprising:
a first cross beam;
a first trunnion engaged with the first cross beam and selectively displaceable in first and second displacement directions with respect to the first cross beam between a first trunnion position and a second trunnion position;
a first leg pivotally connected to the first trunnion; and
a first brace pivotally connected to the first leg and pivotally connected to the first cross beam;
a first drive mechanism operably engaged with the first trunnion, the first drive mechanism configured to selectively displace the first trunnion in the first and second displacement directions with respect to the first cross beam, the first drive mechanism comprising:
a first drive screw;
a first drive nut threadingly engaged with the first drive screw; and
a first drive plate engaged with the first drive nut and the first trunnion such that a first portion of the drive screw is received within the first drive nut and a second portion of the drive screw spaced apart from the first portion of the drive screw is received within the first trunnion, such that rotation of the first drive screw in a first direction of rotation results in displacement of the first drive nut, the first drive plate, and the first trunnion in the first displacement direction with respect to the first cross beam; and such that rotation of the first drive screw in a second direction of rotation results in displacement of the first drive nut, the first drive plate, and the first trunnion in the second displacement direction with respect to the first cross beam.

2. The jack of claim 1 further comprising a second drive plate engaged with the first drive nut and the first trunnion.

3. The jack of claim 1 further comprising a first electric motor operably associated with the first drive screw.

4. The jack of claim 3 further comprising a first transmission interposed between the first electric motor and the first drive screw.

5. The jack of claim 4, the transmission comprising a locking gear set.

6. The jack of claim 1 wherein displacement of the first trunnion with respect to the first cross beam in the first displacement direction results in rotation of the first leg in a first angular direction with respect to the first cross beam and rotation of the first brace in the first angular direction with respect to the first cross beam, and
wherein displacement of the first trunnion with respect to the first cross beam in the second displacement direction results in rotation of the first leg in a second angular direction opposite the first angular direction with respect to the first cross beam and rotation of the first brace in the second angular direction with respect to the first cross beam.

7. The jack of claim 1 wherein the first leg is pivotally connected to the first brace at a first pivot point proximate an end of the first leg and an end of the first brace; wherein the first pivot point is in a first pivot point position distant from the first cross beam when the first trunnion is in the first trunnion position, and the wherein the first pivot point is in a second pivot point position proximate the first cross beam when the first trunnion is in the second trunnion position.

8. The jack of claim 7 wherein the first pivot point moves predominantly perpendicular to the first cross beam when the first trunnion moves from the first trunnion position toward the second trunnion position.

9. The jack of claim 7 wherein the first pivot point moves predominantly perpendicular to the first cross beam when the first trunnion approaches and departs the first position.

10. The jack of claim 1 wherein at least two of the first cross beam, the first leg, and the first brace are substantially parallel to each other when the first trunnion is in the second position.

11. The jack of claim 1 further comprising a first foot pivotally connected to the first leg.

12. The jack of claim 1 further comprising:
a second lifting section operably connected to the first lifting section, the second lifting section comprising:
a second cross beam;
a second trunnion engaged with the second cross beam and selectively displaceable in third and fourth displacement directions with respect to the second cross beam between a third trunnion position and a fourth trunnion position;
a second leg pivotally connected to the second trunnion; and
a second brace pivotally connected to the second leg and pivotally connected to the second cross beam;
a second drive mechanism operably engaged with the second first trunnion, the second drive mechanism configured to selectively displace the second trunnion in the third and fourth displacement directions with respect to the second cross beam, the second drive mechanism comprising:
a second drive screw;
a second drive nut threadingly engaged with the second drive screw;
a second drive plate engaged with the second drive nut and the second trunnion such that rotation of the second drive screw in a third direction of rotation results in displacement of the second drive nut, the second drive plate, and the second trunnion in the third displacement direction with respect to the second cross beam and rotation of the second drive screw in a fourth direction of rotation results in displacement of the second drive nut, the second drive plate, and the second trunnion in the fourth displacement direction with respect to the second cross beam.

13. The jack of claim 12 further comprising an intermediate section interposed between the first lifting section and the second lifting section.

14. The jack of claim 12 wherein the first trunnion is displaceable independent of the second trunnion and the second trunnion is displaceable independent of the first trunnion.

15. The jack of claim 12 wherein the second leg is pivotally connected to the second brace at a second pivot point proximate an end of the second leg and an end of the second brace, wherein the second pivot point is in a third pivot point position distant from the second cross beam when the second trunnion is in the third trunnion position, and the wherein the second pivot point is in a fourth pivot point position proximate the second cross beam when the second trunnion is in the fourth trunnion position.

16. The jack of claim 15 wherein the second pivot point moves predominantly perpendicular to the second cross beam when the second trunnion moves from the third trunnion position toward the fourth trunnion position.

17. The jack of claim 12 wherein displacement of the first trunnion in the first displacement direction with respect to the first cross beam results in rotation of the first leg in a first angular direction with respect to the first cross beam and rotation of the first brace in the first angular direction with respect to the first cross beam,
wherein displacement of the first trunnion in the second displacement direction with respect to the first cross beam results in rotation of the first leg in a second angular direction opposite the first angular direction with respect to the first cross beam and rotation of the first brace in the second angular direction with respect to the first cross beam;
wherein displacement of the second trunnion in the third displacement direction with respect to the second cross beam results in rotation of the second leg in a third angular direction with respect to the second cross beam and rotation of the second brace in the third angular direction with respect to the second cross beam;
wherein displacement of the second trunnion in the fourth displacement direction with respect to the second cross beam results in rotation of the second leg in a fourth angular direction opposite the third angular direction with respect to the second cross beam and rotation of the second brace in the fourth angular direction with respect to the second cross beam; and
wherein the first trunnion is displaceable independent of the second trunnion and the second trunnion is displaceable independent of the first trunnion.

18. The system of claim 17 wherein:
the first leg is pivotally connected to the first brace at a first pivot point proximate an end of the first leg and an end of the first brace;
the first pivot point moves predominantly perpendicular to the first cross beam when the first trunnion moves from the first trunnion position toward the second trunnion position;
the second leg is pivotally connected to the second brace at a second pivot point proximate an end of the second leg and an end of the second brace; and
the second pivot point moves predominantly perpendicular to the second cross beam when the second trunnion moves from the third trunnion position toward the fourth trunnion position.

19. The system of claim 17 wherein the first and second displacement directions are parallel to the third and fourth displacement directions.

20. The jack of claim 1 further comprising:
a first mounting plate attached to the first cross beam, the first mounting plate defining a first plurality of apertures arranged in a non-linear configuration.

21. The jack of claim 20 in combination with a first bracket defining a second plurality of apertures and a plurality of fasteners extending through ones of said first plurality of apertures and corresponding ones of said second plurality of apertures.

* * * * *